US011138158B2

(12) United States Patent
Sarakas

(10) Patent No.: US 11,138,158 B2
(45) Date of Patent: Oct. 5, 2021

(54) BINDING A LOCAL DATA STORAGE DEVICE TO REMOTE DATA STORAGE

(71) Applicant: Callplex, Inc., St. Peters, MO (US)

(72) Inventor: Stephen T. Sarakas, St. Peters, MO (US)

(73) Assignee: Callplex, Inc., St. Peters, MO (US)

( * ) Notice: Subject to any disclaimer, the term of this patent is extended or adjusted under 35 U.S.C. 154(b) by 192 days.

(21) Appl. No.: 16/416,879

(22) Filed: May 20, 2019

(65) Prior Publication Data

US 2020/0374370 A1  Nov. 26, 2020

(51) Int. Cl.
| | |
|---|---|
| *G06F 16/182* | (2019.01) |
| *G06F 3/06* | (2006.01) |
| *G06F 16/178* | (2019.01) |
| *G06F 7/499* | (2006.01) |
| *H04L 29/08* | (2006.01) |
| *G06F 16/20* | (2019.01) |

(52) U.S. Cl.
CPC ............ *G06F 16/182* (2019.01); *G06F 3/062* (2013.01); *G06F 3/067* (2013.01); *G06F 3/0643* (2013.01); *G06F 3/0646* (2013.01); *G06F 7/49931* (2013.01); *G06F 16/178* (2019.01); *G06F 16/20* (2019.01); *H04L 67/1097* (2013.01)

(58) Field of Classification Search
CPC ...... G06F 16/182; G06F 16/178; G06F 16/20; G06F 3/062; G06F 3/0643; G06F 3/0646; G06F 3/067; G06F 7/49931; H04L 67/1097
See application file for complete search history.

(56) References Cited

U.S. PATENT DOCUMENTS

| | | |
|---|---|---|
| 7,020,665 B2 | 3/2006 | Douceur et al. |
| 7,937,379 B2 | 5/2011 | Ganesan et al. |
| 8,015,342 B2 | 9/2011 | Ahn et al. |
| 8,209,363 B2 | 6/2012 | Palthepu et al. |
| 8,209,364 B2 | 6/2012 | Cheng |
| 8,321,465 B2 | 11/2012 | Farber et al. |

(Continued)

FOREIGN PATENT DOCUMENTS

GB    2530726    11/2016

OTHER PUBLICATIONS

Kapusta, Katarzyna et al. Circular All-Or-Nothing: Revisiting Data Protection Against Key Exposure. Feb. 2019. Cornell University Cryptography and Security [arXiv:1901.08083 [cs.CR]].

(Continued)

*Primary Examiner* — Rupal Dharia
*Assistant Examiner* — Steven C Nguyen
(74) *Attorney, Agent, or Firm* — Husch Blackwell LLP

(57) ABSTRACT

Data file storage systems and methods that bind a local portable data storage device to remote data storage space with an emergent data file storage system. Data files and directory nodes are associated with data aspect pairs, each comprised of a series of interdependent blocks of characteristically high-entropy data. Blocks of data comprising a remote data aspect are transferred to remote data aspect storage locations. A single block of data comprising a local data aspect is transferred separately to the local portable data storage device. Neither a local data aspect nor a remote data aspect contains information about the corresponding data file or directory node.

20 Claims, 36 Drawing Sheets

(56) References Cited

U.S. PATENT DOCUMENTS

| | | | |
|---|---|---|---|
| 8,363,837 B2 | 1/2013 | Williams | |
| 8,447,889 B2 | 5/2013 | Jogand-Coulomb et al. | |
| 8,527,549 B2 | 9/2013 | Cidon | |
| 8,589,513 B1* | 11/2013 | Tamer | G06F 16/27 |
| | | | 709/218 |
| 8,627,104 B2 | 1/2014 | Oltmans et al. | |
| 8,688,753 B2 | 4/2014 | Amit et al. | |
| 8,726,120 B2 | 5/2014 | Baptist et al. | |
| 8,745,102 B2 | 6/2014 | Hussain et al. | |
| 8,756,390 B2 | 6/2014 | Chu et al. | |
| 8,768,971 B2 | 7/2014 | Apacible et al. | |
| 8,862,900 B2 | 10/2014 | Chen | |
| 8,938,790 B2 | 1/2015 | Kang et al. | |
| 8,943,313 B2 | 1/2015 | Glew et al. | |
| 8,965,939 B2 | 2/2015 | Leggette et al. | |
| 8,990,475 B2 | 3/2015 | Meir et al. | |
| 8,996,647 B2 | 3/2015 | Lingafelt et al. | |
| 9,063,848 B2 | 6/2015 | Meir et al. | |
| 9,064,127 B2 | 6/2015 | O'Hare et al. | |
| 9,197,419 B1 | 11/2015 | Chandrasekhar et al. | |
| 9,225,720 B1 | 12/2015 | Chandrasekhar et al. | |
| 9,251,365 B2 | 2/2016 | Maheshwari et al. | |
| 9,253,164 B2 | 2/2016 | Gouge et al. | |
| 9,253,166 B2 | 2/2016 | Gauda | |
| 9,292,700 B2 | 3/2016 | Parker et al. | |
| 9,317,708 B2 | 4/2016 | Lee et al. | |
| 9,483,657 B2 | 11/2016 | Paul et al. | |
| 9,736,142 B2 | 8/2017 | Davis et al. | |
| 9,774,449 B2 | 9/2017 | Bellare et al. | |
| 9,842,217 B2 | 12/2017 | Parker et al. | |
| 9,860,276 B2 | 1/2018 | Crane et al. | |
| 9,876,637 B2 | 1/2018 | Gauda | |
| 10,129,222 B2 | 11/2018 | Maheshwari et al. | |
| 10,225,205 B2 | 3/2019 | Resch et al. | |
| 10,234,075 B2 | 3/2019 | Mosko | |
| 2004/0015724 A1 | 1/2004 | Pham et al. | |
| 2006/0195703 A1 | 8/2006 | Jakubowski | |
| 2010/0030827 A1* | 2/2010 | Sarakas | G06F 16/188 |
| | | | 707/E17.01 |
| 2010/0070544 A1 | 3/2010 | Gopalan et al. | |
| 2010/0180153 A1* | 7/2010 | Jernigan, IV | G06F 11/1076 |
| | | | 714/6.12 |
| 2011/0022640 A1 | 1/2011 | Franco et al. | |
| 2011/0197056 A1 | 8/2011 | Chen | |
| 2011/0252071 A1 | 10/2011 | Cidon | |
| 2015/0127950 A1 | 5/2015 | Irvine | |
| 2015/0172045 A1 | 6/2015 | Leidich et al. | |
| 2015/0172272 A1 | 6/2015 | Levner | |
| 2015/0229671 A1 | 8/2015 | Boss et al. | |
| 2017/0005796 A1 | 1/2017 | Bellare et al. | |
| 2017/0180353 A1 | 6/2017 | Zhu et al. | |
| 2017/0187812 A1 | 6/2017 | Chen et al. | |
| 2018/0013731 A1 | 1/2018 | Maheshwari et al. | |
| 2018/0121369 A1 | 5/2018 | Poeppelmann et al. | |
| 2019/0081783 A1 | 3/2019 | Bohli et al. | |

OTHER PUBLICATIONS

Meijer, Carlo et al. Self-Encrypting Deception: Weaknesses in the Encryption of Solid-State Drives (SSDs). May 2018. Radboud University, the Netherlands.

Pass, Rafael et al. Concurrent Zero Knowledge, Revisited. Jan 2014. pp. 45-66. vol. 27 Issue 1. Journal of Cryptology.

Karame, Ghassan O. et al. Securing Cloud Data in the New Attacker Model. 2014. International Association for Cryptologic Research.

Koblitz, Neal et al. Another Look at "Provable Security". Jan. 2007. pp. 3-37. vol. 20 Issue 1. Journal of Cryptology.

Yao, Andrew C. Protocols for Secure Computations. Nov. 1982. pp. 160-164. 23rd Annual Symposium on Foundations of Computer Science.

"11 reasons encryption is (almost) dead" https://www.cio.com/article/2376570/11-reasons-encryption-is—almost—dead.html.

"Encryption Wouldn't Have Stopped Anthem's Data Breach" https://www.technologyreview.com/s/535111/encryption-wouldnt-have-stopped-anthems-data-breach/.

"Researchers find Stuxnet, Mirai, WannaCry lurking in industrial USB drives" https://www.zdnet.com/article/almost-half-of-usb-drives-in-industrial-settings-pose-severe-security-risk/.

"Enterprise encryption adoption up, but the devil's in the details" https://www.networkworld.com/article/3098354/enterprise-encryption-adoption-up-but-the-devils-in-the-details.html.

"The Cloud's Biggest Threat Are Data Sovereignty Laws" https://techcrunch.com/2015/12/26/the-clouds-biggest-threat-are-data-sovereignty-laws/.

"Obscurity is the only security" https://www.cyberscoop.com/obscurity-cryptography-jonathan-wilkins-op-ed/.

"Ex-NSA Director Rogers: Insider Threat Prevention a 'Contract'" https://www.darkreading.com/risk/ex-nsa-director-rogers-insider-threat-prevention-a-contract/d/d-id/1334243.

* cited by examiner

```
000    class Xoroshiro128
       {
           public Xoroshiro128(UInt64 seed)
           {
               var x = seed;
               var z = x += 0x9E3779B97F4A7C15;
               z = (z ^ (z >> 30)) * 0xBF58476D1CE4E5B9;
               z = (z ^ (z >> 27)) * 0x94D049BB133111EB;
               _seed1 = z ^ (z >> 31);
               z = x + 0x9E3779B97F4A7C15;
010            z = (z ^ (z >> 30)) * 0xBF58476D1CE4E5B9;
               z = (z ^ (z >> 27)) * 0x94D049BB133111EB;
               _seed2 = z ^ (z >> 31);
           } private UInt64 _seed1, _seed2;

[MethodImpl(MethodImplOptions.AggressiveInlining)]
           private static UInt64 rotl(UInt64 x, int k)
           {
020            return (x << k) | (x >> (64 - k));
           } public UInt64 Next()
           {
               var s0 = _seed1;
               var s1 = _seed2;
               var result = s0 + s1;

s1 ^= s0;
030            _seed1 = rotl(s0, 55) ^ s1 ^ (s1 << 14);
               _seed2 = rotl(s1, 36);

return result;
           } public int NextInt(int min, int max)
           {
               double ratio = (double)Next() / (double)UInt64.MaxValue;
               int rint = (int)(ratio * (max - min));
040            return rint + min;
           }
       }
```

| 0 | 1 | 2 | 3 |

1604  n = 3    n = 2    n = 1    n = 0

1605
```
3 3       
2 2       
1 1      3 3      1 1
0 0      1 1      0 0      1 1
         0 0
```

1606  0:3 -> 2    0:2 -> 2    0:1 -> 0    0:0 -> 0

1607
```
                          2 0
                 1 3      1 3
         0 2     0 2      0 2
```

1600        1601        1602        1603

1302

| 2 | 3 | 0 | 1 |

Figure 16

```
000    class Permuter
       {
           const int Xperm = 4;
           bool dd, ck;
           List<byte> PK;

public Permuter(List<byte> K)
           {
               PK = K;
           }
010
           public bool Permute(dynamic permMT)
           {
               int count = PK.Count;
               int caps = PK.Count % Xperm;
               int s = PK.Count - caps;
               s /= Xperm;

List<byte> cap = PK.GetRange(0, caps);
               PK.RemoveRange(0, cap.Count);
020
               List<byte[]> ints = new List<byte[]>();
               while (PK.Count > 0)
               {
                   ints.Add(PK.Take(s).ToArray());
                   PK.RemoveRange(0, s);
               }

List<byte[]> rints = new List<byte[]>();
               while (ints.Count > 0)
030            {
                   int n = permMT.NextInt(0, ints.Count);
                   rints.Add(ints[n]);
                   ints.RemoveAt(n);
               }
               if (cap.Count > 0)
               {
                   int n = permMT.NextInt(0, rints.Count);
                   rints.Insert(n, cap.ToArray());
               }
040
               while (rints.Count > 0)
               {
                   PK.AddRange(rints[0]);
                   rints.RemoveAt(0);
               }
               ck = PK.Count == count;
               return ck;
           }
       }
```

Figure 17

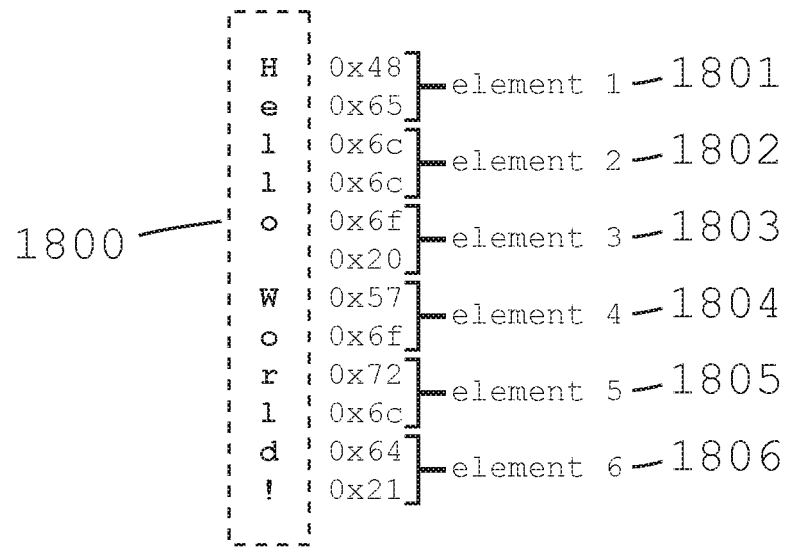
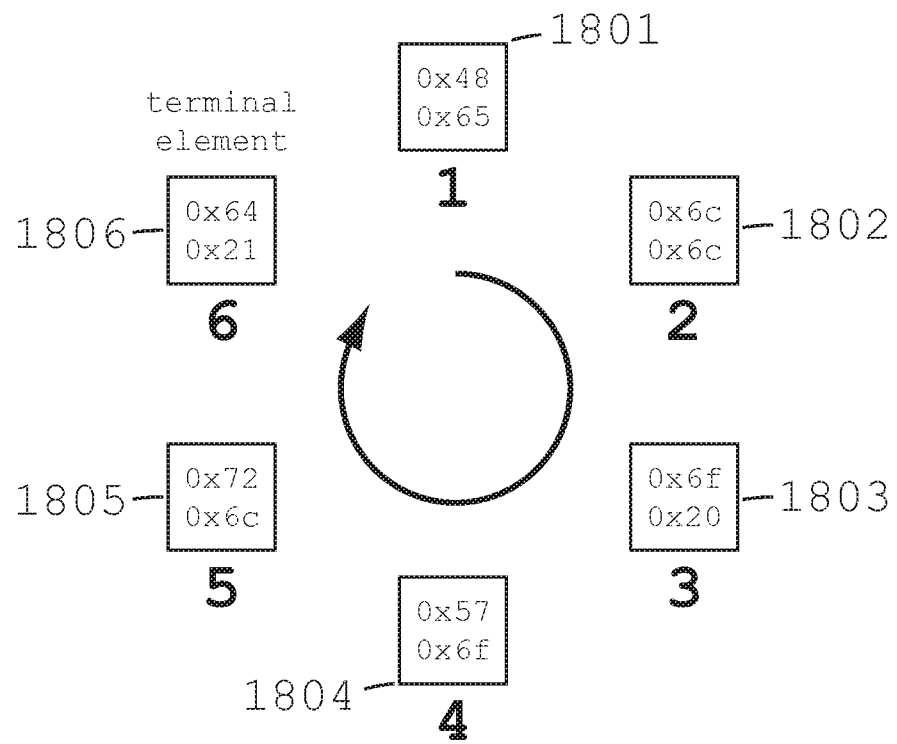
Figure 18

```
000    class Depermuter
       {
           const int Xperm = 4;
           bool dd,ck;
           List<byte> PK;

public Depermuter(List<byte> K)
           {
               PK = K;
           }
010
           public bool Depermute(dynamic Perm)
           {
               int count = PK.Count;
               int caps = PK.Count % Xperm;
               int s = PK.Count - caps;
               s /= Xperm;
               int x = Xperm - 1;

List<byte> cap = new List<byte>();
020            if (caps > 0)
               {
                   int capcount = Perm[0];
                   cap = PK.GetRange(capcount * s, caps);
                   PK.RemoveRange(capcount * s, caps);
                   Perm.RemoveAt(0);
               }

List<byte[]> rK = new List<byte[]>();
               while (PK.Count > 0)
030            {
                   int n = Perm[0];
                   byte[] block = PK.GetRange(x * s, s).ToArray();
                   rK.Insert(n, block);
                   PK.RemoveRange(x * s, s);
                   Perm.RemoveAt(0);
                   x--;
               }
               while (rK.Count > 0)
               {
040                PK.AddRange(rK[0]);
                   rK.RemoveAt(0);
               }
               PK.InsertRange(0, cap);
               ck = PK.Count == count;
               return ck;
           }
       }
```

Figure 33

BINDING A LOCAL DATA STORAGE DEVICE TO REMOTE DATA STORAGE

TECHNICAL FIELD

The present disclosure generally relates to methods and systems that improve utilization of data storage space across disparate data storage devices.

BACKGROUND

Portable data storage devices, such as flash drives for example, offer many advantages including compactness and low cost. Locally transferring data files to and from a portable data storage device is often faster than using cloud storage. But the use of portable data storage devices is accompanied by serious drawbacks. The loss or theft of a device, made worse by late discovery, can affect operations if data files stored on the device contain sensitive information. Portable data storage devices also make it easy to steal data files and to introduce unwanted malware, thereby circumventing network security. Portable data storage devices are available that encrypt the data files stored on them, but this is no remedy for data file theft, nor the unwanted introduction of malware. Moreover, portable data storage devices have inflexible data storage space. Portable data storage devices with greater capacity may be available, but this solution is more expensive if the need for additional data storage space is infrequent.

Alternatively, data files may be stored remotely in the cloud. Users receive inexpensive and flexible data storage space as a service. While transfer speeds are typically slower than local data storage devices, security remains the chief drawback. Access controls and encryption must be added separately. But these measures impose other burdens such as the responsibility for key management. Data in transit is protected differently than data when stored, requiring the application of different types of encryption. Data sovereignty concerns and the difficulty federating multiple providers add to the drawbacks.

An existential problem inherent in the use of both local data storage devices and cloud storage is the problem of physical location. When data files are stored in physical locations, their paths are separately identifiable. Even if a data file is divided into parts for efficient storage, the parts are still linked. Linking is accomplished by attaching to a part some information about other parts, or by storing their association in a map. Storing data files in physical locations increases their exposure to theft. Recall that unlike the theft of physical objects, theft of information can remain undetected. Encryption is intended to limit the impact of compromise, but requires new credentials to be created which are in turn stored in other physical locations. Encryption provides no further benefit if credentials are compromised. Moreover, failure of either access controls or encryption may not become immediately known to a user nor leave them with any recourse.

Local data storage devices and cloud storage have other disadvantages which are perhaps less obvious. Transferring a data file to storage and encrypting a data file are processes that must be completed at once to be considered successful. Generally, a data file partially transferred to storage is treated as a failure. Similarly, a partially encrypted data file will be discarded. Conventional data storage technologies simply do not provide a clear way to use local portable data storage devices together with cloud storage for combined advantage.

SUMMARY

Embodiments of the present invention overcome numerous disadvantages inherent in the use of conventional data storage technologies by generating data aspect pairs corresponding to original data files. For each data aspect pair, a remote data aspect is transferred to remote data storage space and a local data aspect is separately transferred to a local portable data storage device. When data file directories are treated to similar steps, an entire data file system with emergent properties is established—the emergent data file storage system. Neither local data aspects nor remote data aspects contain information from corresponding original data files. The system uses data aspect pairs to later generate data objects substantially identical in content, format and attributes to corresponding original data files and original data file directories. Moreover, process information needed to generate a data object from a data aspect pair, is itself stored in the emergent data file storage system. Apart from the emergent data file storage system, original data files and directories are provably unknowable. Accordingly, aspects of the present invention bind the local portable data storage device to the remote data storage space via the emergent data file storage system.

An exemplary advantage achieved by binding the local portable data storage device to the remote data storage space, is that of the inherent inaccessibility of emergent data files and directories, given direct access to remote data storage space or to the local portable data storage device. Conventional data storage technologies typically combine storage resources while potentially exposing data to direct access at multiple physical locations. Another exemplary advantage achieved by binding the local portable data storage device to the remote data storage space, is one of improved utilization of data storage spaces. A software application executing the emergent data file storage system provides users with a singular organization of emergent data files and directories, even as data aspect pairs are distributed to disparate data storage devices.

Another exemplary advantage achieved by binding the local portable data storage device to the remote data storage space, is one of increased efficiency gained by the substantially adaptive process. In an exemplary embodiment, transference of blocks of data to local data storage space and to remote data storage space can vary widely for a process adaptive to data transfer time and data storage space constraints. In another embodiment, a process adaptive to data transfer time and data storage space constraints may be interrupted then later resumed, yet with undiminished information security.

In accordance with an embodiment, a software application is given concurrent access to both remote data aspect storage and to the local portable data storage device, thereby permitting a user to explore the emergent data file storage system and to transfer data into and out of the emergent data file storage system.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other objects and features will be in part apparent and in part pointed out hereinafter.

BRIEF DESCRIPTION OF THE DRAWINGS

FIG. 15 presents source code useful in implementing a type of seeded pseudo-random number generator (i.e., PRNG) of an embodiment.

FIG. 16 illustrates permutation operations associated with a process, in accordance with an embodiment.

FIG. 17 presents source code useful in implementing a permuter of an embodiment.

FIG. 18 illustrates an example of the preparation of a first set of data, the division of data into elements and their arrangement into cyclic order, in accordance with an embodiment.

FIG. 33 presents source code useful in implementing a depermuter of an embodiment.

Figure 1:
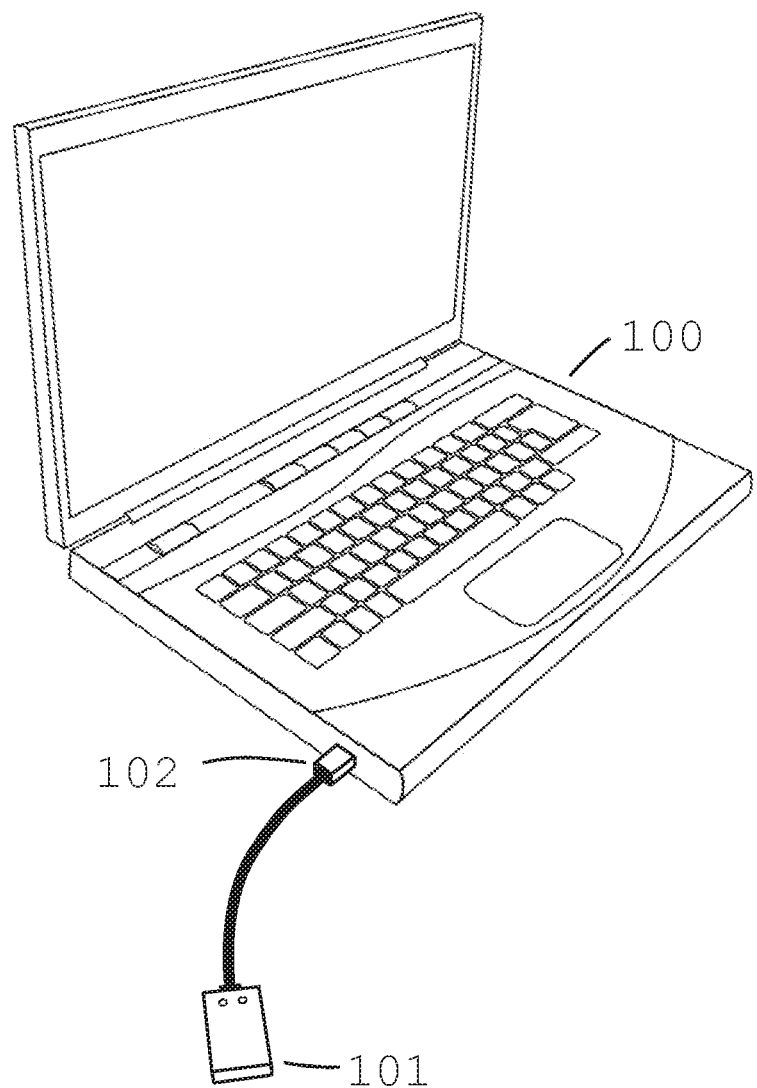
FIG. 1 illustrates an exemplary suitable computing system environment in which aspects of the invention may be implemented.

Appendix A provides technical preliminaries as a supplement to the Detailed Description.

Corresponding reference characters indicate corresponding parts throughout the drawings.

DETAILED DESCRIPTION

As further described herein, the present invention includes an emergent data file storage system that provides information security inherent in the transference to disparate data storage devices of data aspect pairs corresponding to original data files and directories. A data aspect pair is a series of interdependent blocks of high-entropy data; data that is characteristically indistinguishable from data produced by a stochastic (i.e., Gaussian) process. Each data aspect pair is composed of a remote data aspect and a local data aspect. A remote data aspect is comprised of one or more blocks of data, and a local data aspect is comprised of a single block of data. Remote data aspects are transferred to remote data storage space and local data aspects are separately transferred to a local portable data storage device. Accordingly, aspects of the present invention increase the utilization of data storage space available across disparate data storage devices while providing inherent information security.

FIG. 1 depicts an exemplary embodiment in which a local portable data storage device 101 is locally connected to a host computer 100 at a common interface 102. Exemplary interfaces include, but are not limited to, Universal Serial Bus (i.e., USB), Serial AT Attachment (i.e., SATA), Small Computer System Interface (i.e., SCSI), and the like, and/or any medium that allows data to be physically transferred through serial or parallel communication channels (e.g., copper wire, optical fiber, computer bus, etc.). Host computer 100 may be any computing device, such as a laptop computing device, tablet computing device, desktop computing device, personal computer, server computing device, and the like. Local portable data storage device 101 is shown physically connected to host computer 100, but may be detached from the same host computer, even reattached to a different host computer not shown.

Figure 2:
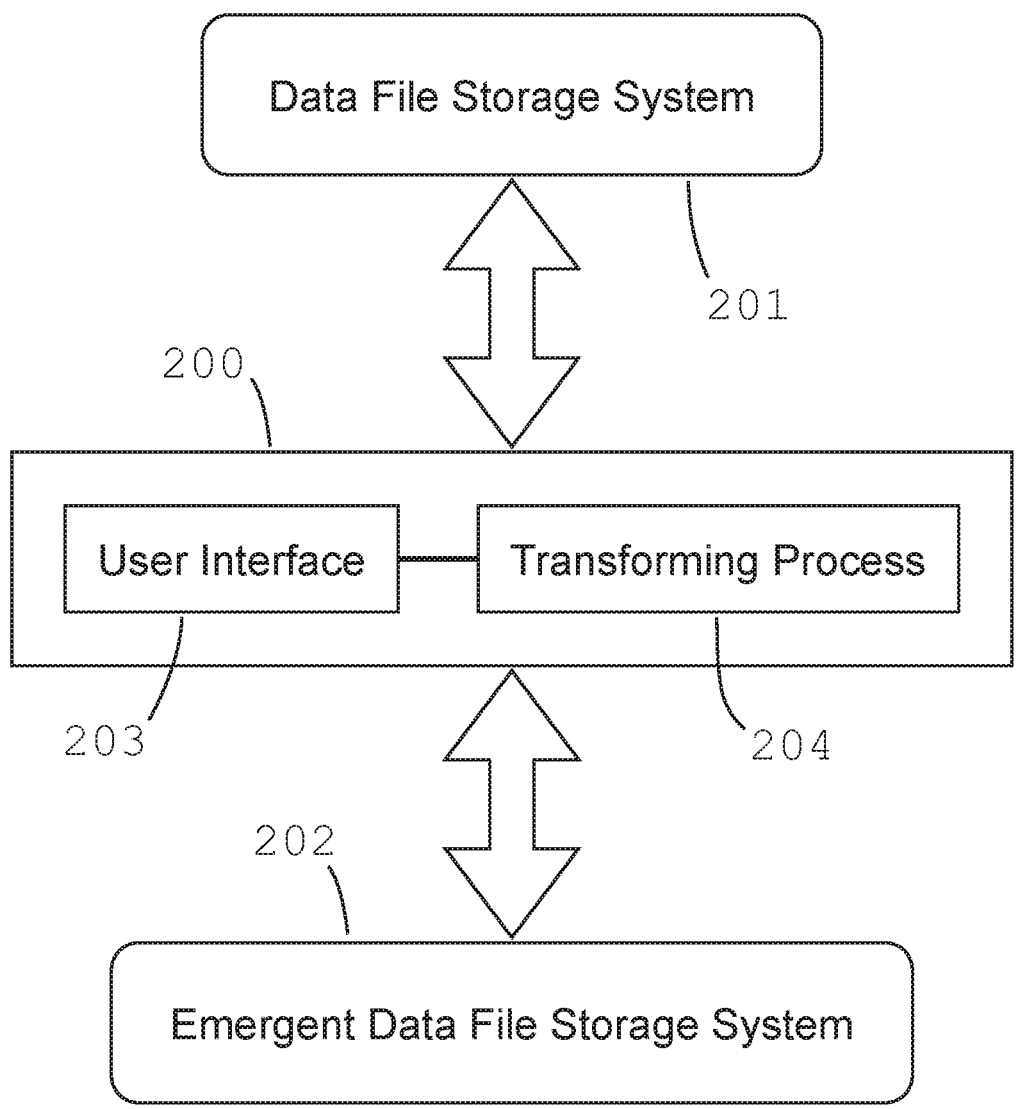
FIG. 2 depicts the relationship between a software application, data file storage system and emergent data file storage system of an embodiment.

FIG. 2 depicts the relationship between a software application 200, data file storage system 201 and emergent data file storage system 202. User interface 203 and transforming process 204 are primary components of software application 200. Other components of software application 200 (e.g. input/output, event handling, etc.) are not shown. In an embodiment, software application 200 is comprised of a plurality of processor-executable instructions stored in one or more memory devices of host computer 100 and executed by a processor of host computer 100. The transforming process 204 entails numerous operations further described in detail below. Generally, the operations performed are contingent upon the type and length of data file processed. The data file storage system 201 is directly accessible to software application 200. However, the emergent data file storage system 202 is accessible to software application 200 only by means of transforming process 204. Information from an original data file or corresponding emergent data file, cannot be derived by direct examination of a data aspect pair.

Figure 3:
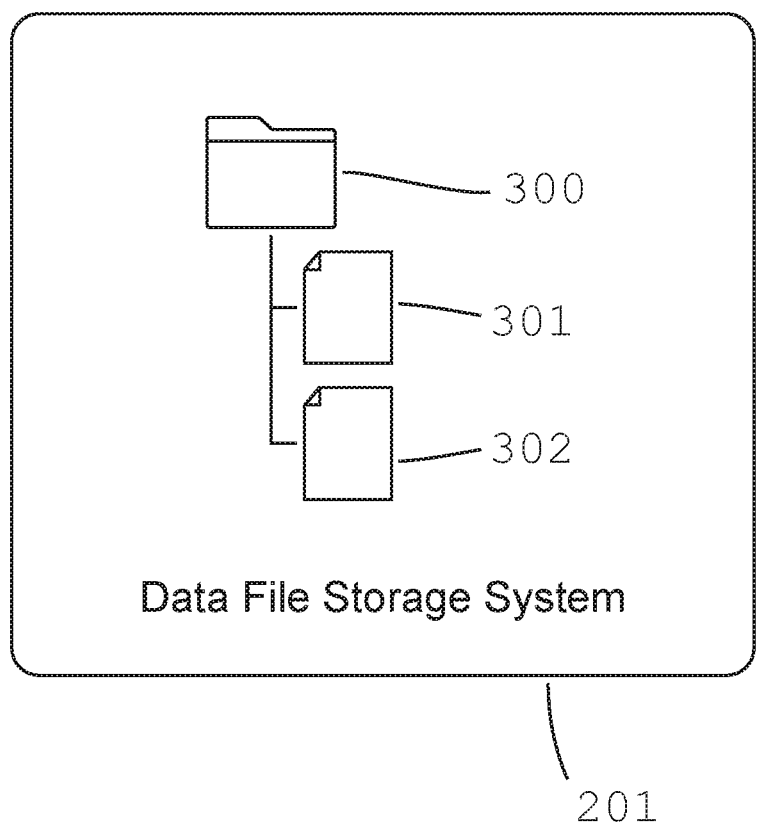
FIG. 3 illustrates an exemplary data file storage system as comprised of directory node and data file constituents.

FIG. 3 illustrates data file storage system 201 in greater detail. Directory node 300, data files 301 and 302, are broadly referred to as constituents. Directory node and data file constituents in FIG. 3 are representative of any data files accessible to a user. Data files accessible to a user may be stored on any type of media, organized in accordance with any type of filesystem and accessible via any type of communication channel where available on Network Attached Storage (i.e., NAS) and/or Direct Attached Storage (i.e., DAS).

Figure 4:
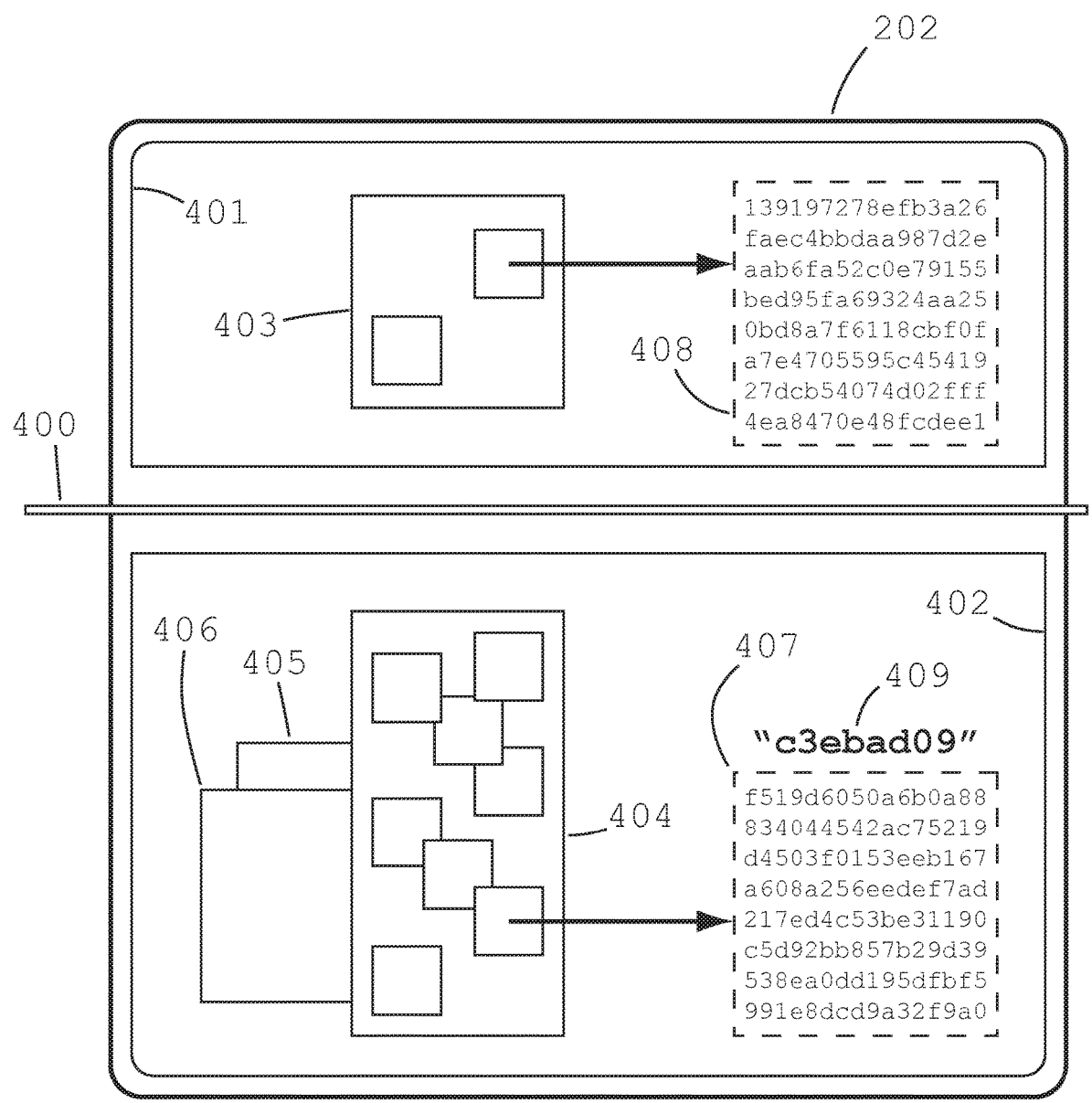
FIG. 4 is a schematic of the plurality of exemplary data storage regions of which exemplary data storage space is composed.

FIG. 4 is a schematic of the plurality of data storage regions from which the emergent data file storage system 202 is manifested by means of transforming process 204, when software application 200 is given access to data storage regions of both local data storage space 401 and remote data storage space 402, which are physically separated as denoted by 400. Remote data storage space 402 is remote only with respect to local portable data storage device 101. It is within the scope of the present invention that remote data storage space 402 is made available to software application 200 by direct attachment to host computer 100. Alternatively, remote data storage space 402 may instead be made available to software application 200 by network attachment. Physical distances to network attached remote data storage space are unspecified.

Data storage regions are provisions for data storage separately identifiable by software application 200. By way of example and not limitation, a data storage region may be identified by disk path (e.g., a folder name and drive letter). Each data storage region is comprised of one or more physical locations. The exact physical location (e.g., drive, rack, disc, sector, etc.) within a region of remote data storage space that a particular block of data is stored, is not addressed by software application 200. It is the responsibility of the remote data storage facility to allocate data storage space within a region of remote data storage space that is commensurate with a given block of data. Similarly, when a block of data is transferred by software application 200 to local portable data storage device 101, the exact physical location (e.g., electronic component, block, page, etc.) assigned to it is a determination made by the local portable data storage device 101.

In an embodiment, the remote data storage facility is comprised of one or more computer devices (e.g., server computing devices, etc.) communicatively connected to each other (e.g., in a cloud storage arrangement, etc.) and configured to store each block of data comprising a remote data aspect, in one or more locations (e.g., drive, rack, disc, sector, etc.). Alternatively, the input/output (i.e., I/O) subsystem of an operating system executing on the host computer serves an equivalent role.

As shown in FIG. 4, remote data storage space 402 is comprised of three regions 404, 405 and 406. Local data storage space 401 is comprised of a single region of data storage space 403. One of ordinary skill in the art will understand that the number of regions of data storage space shown is exemplary and may be more or less in accordance with aspects of the invention. A particular block of data stored in remote data storage space 402 is identified for distribution and retrieval by both region and name. By way of example and not limitation, data block 407 is shown in FIG. 4 as having been given a name 409 and then distributed to region 404. In this example, software application 200 later retrieves data block 407 by providing to the remote data storage facility responsible for managing remote data storage space 402, both a path to region 404 (e.g., a folder name and drive letter) and the name "c3ebad09." Blocks of data stored in local data storage space 401 are identified only by token. A token is any piece of information (e.g., integer, literal string, etc.) that is used by local portable data storage device 101 to distinguish a certain block of data from other blocks of data. By way of example and not limitation, data block 408 in FIG. 4 is assigned a token (not shown) and then transferred to local portable data storage device 101 where it is stored in region 403.

Referring again to FIG. 4, data block 408 is stored in local data storage space 401 and comprised of sixty-four bytes of characteristically high-entropy data. Data block 407 stored in remote data storage space 402 is also comprised of sixty-four bytes of characteristically high-entropy data. One of ordinary skill in the art will understand that the number of bytes shown is exemplary and may be more or less in accordance with aspects of the invention. Blocks of data stored in local data storage space 401 and in remote data storage space 402 (e.g., data blocks 407 and 408), do not contain any information about corresponding original data files or directory nodes, about transforming process 204, nor the identity and relationship of other data blocks. As a result, blocks of data comprising a data aspect pair may be transferred to and retrieved from remote data storage space 402 without additional protection.

Figure 5:
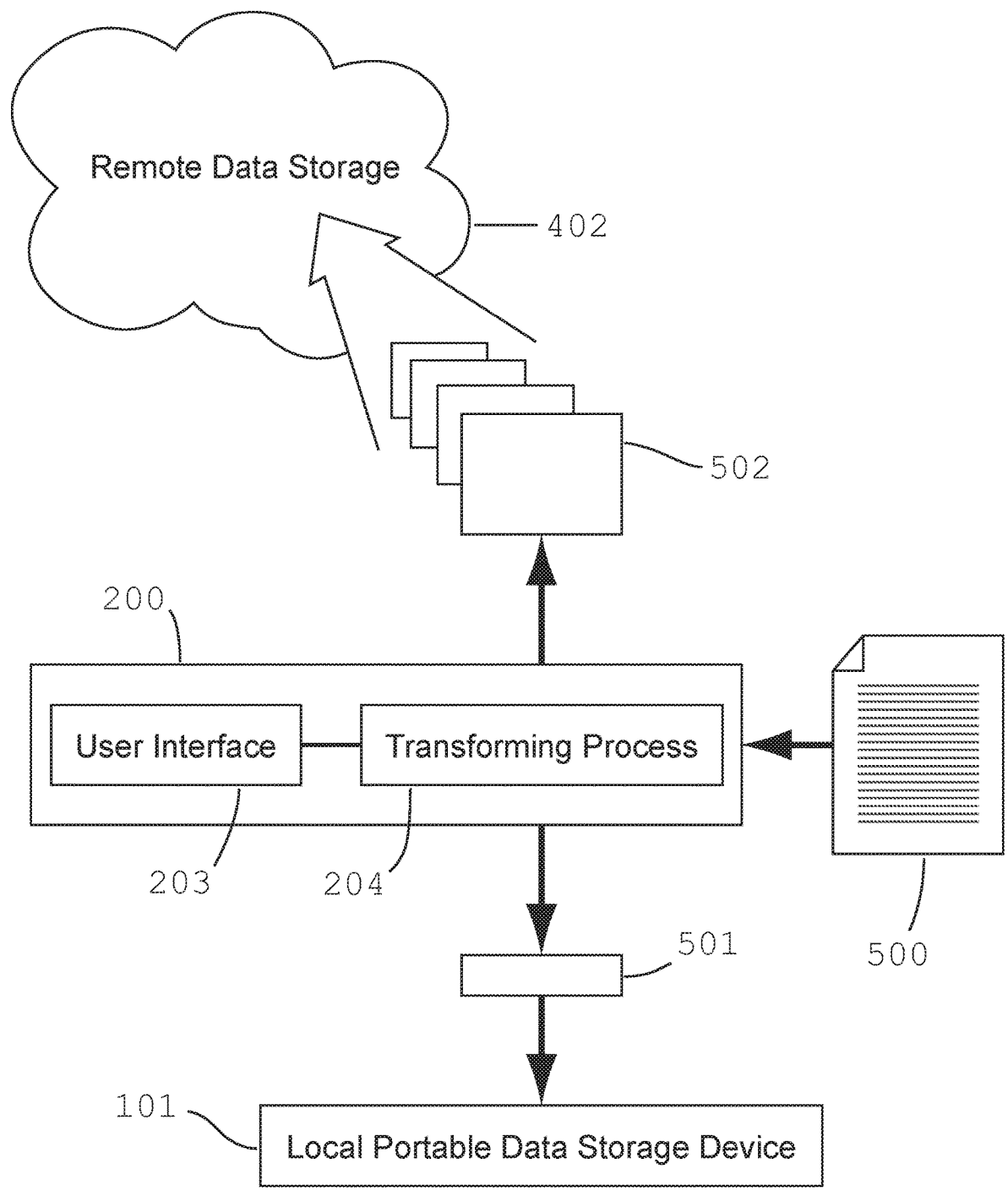
FIG. 5 illustrates the source of data aspects and their relationship to a local portable data storage device and to the emergent data file storage system of an embodiment.

FIG. 5 illustrates an exemplary instance of transforming process 204, whereby a data aspect pair corresponding to an original data file is generated. Original data file 500 represents any original data input (e.g., data file, directory node) accessible to the user and made available to software application 200. In an embodiment, original data file 500 is graphically represented to the user by means of user interface 203. Software application 200 provides the contents of original data file 500 to transforming process 204, whereby the multiple data blocks comprising remote data aspect 502 and the single data block comprising local data aspect 501 are generated. Software application 200 transfers the multiple data blocks comprising remote data aspect 502 to one or more regions of remote data storage space 402. In an embodiment, remote data storage space 402 is comprised entirely of regions accessible to software application 200 by network attachment. Significantly, because remote data aspect 502 does not contain information from the original data file 500, the multiple data blocks comprising remote data aspect 502 may be transferred to remote data storage space 402 openly and without additional protection. Software application 200 separately transfers the single data block comprising local data aspect 501 to local portable data storage device 101.

Figure 6:
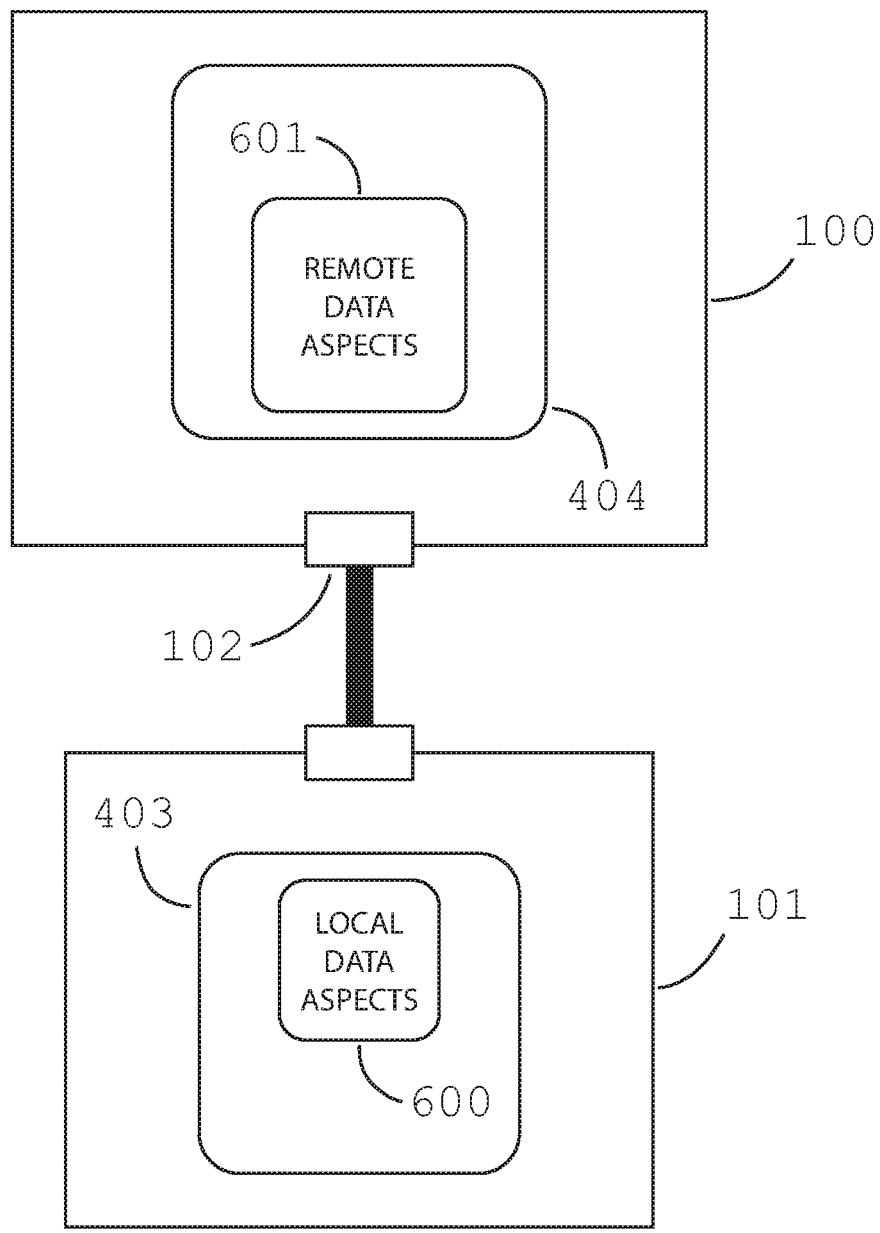
FIG. 6 illustrates the physical separation between local data aspect storage space and remote data aspect storage space, as enforced within a singular computing platform in an embodiment.

FIG. 6 depicts the physical separation of local data aspects 600 from remote data aspects 601, as singularly enforced by host computer 100. Remote data aspects 601 are stored in region 404 of remote data storage space integral to host computer 100. In another embodiment, region 404 of remote data storage space is accessible by peripheral attachment to host computer 100. Remote data storage space is remote only with respect to local portable data storage device 101. Local data aspects 600 are stored in region 403 of local data storage space accessible by direct attachment of local portable storage device 101 to host computer 100 at common interface 102. In an embodiment, local portable data storage device 101 may be detached from host computer 100 and reattached to a different host computer.

Figure 7:
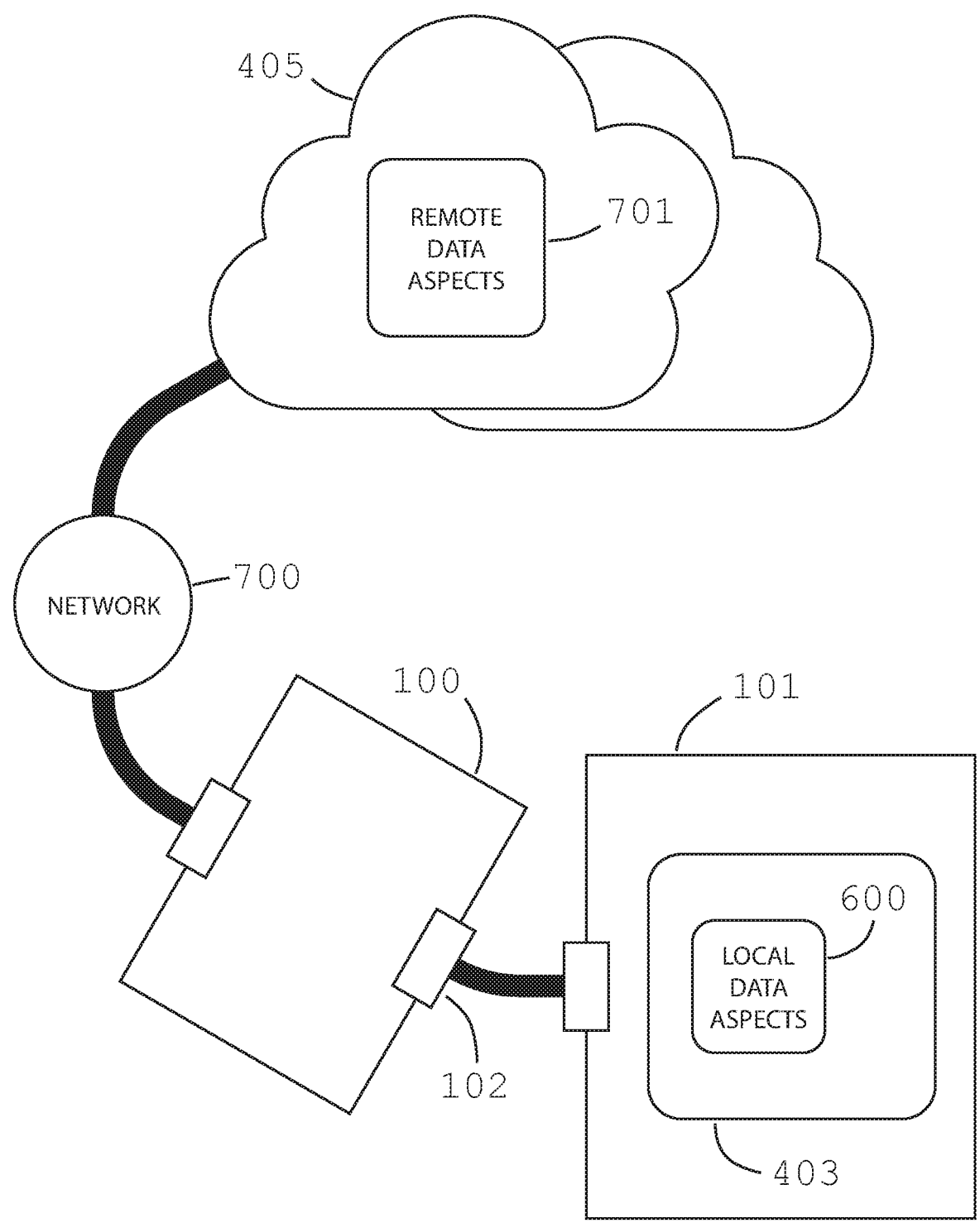
FIG. 7 illustrates the physical separation between local data aspect storage space and network attached remote data storage space, in an embodiment.

FIG. 7 depicts an embodiment in which aspects of the invention bind the local portable data storage device 101 to remote data storage space located physically distant from host computer 100 (e.g., cloud storage). Remote data aspects 701 stored in region 405 of remote data storage space, are transferred via network connections 700 to and from host computer 100, in accordance with emergent data file storage system application software executing there. Local data aspects 600 are stored in region 403 of local data storage space accessible by direct attachment of local portable data storage device 101 to host computer 100 at common interface 102, as required by the same emergent data file storage system application software.

The network connections 700 are capable of facilitating the exchange of data (e.g., remote data aspects 701, etc.) between regions of remote data storage space and host computer 100. The network connections 700 may include a wide-area network (i.e., WAN) that is connectable to other telecommunications network, including other WANs, local area networks (i.e., LANs), and/or portions of the Internet or an intranet. The network connections 700 may include any telecommunications network that facilitates the exchange of data, such as those that operate according to the IEEE 802.3 (e.g., Ethernet) and/or the IEEE 802.11 (e.g., Wi-Fi) protocols, for example. In other embodiments, network connections 700 include any medium that allows data to be electronically transferred through serial or parallel communication channels (e.g., copper wire, optical fiber, computer bus, wireless communication channel, etc.).

Figure 8:
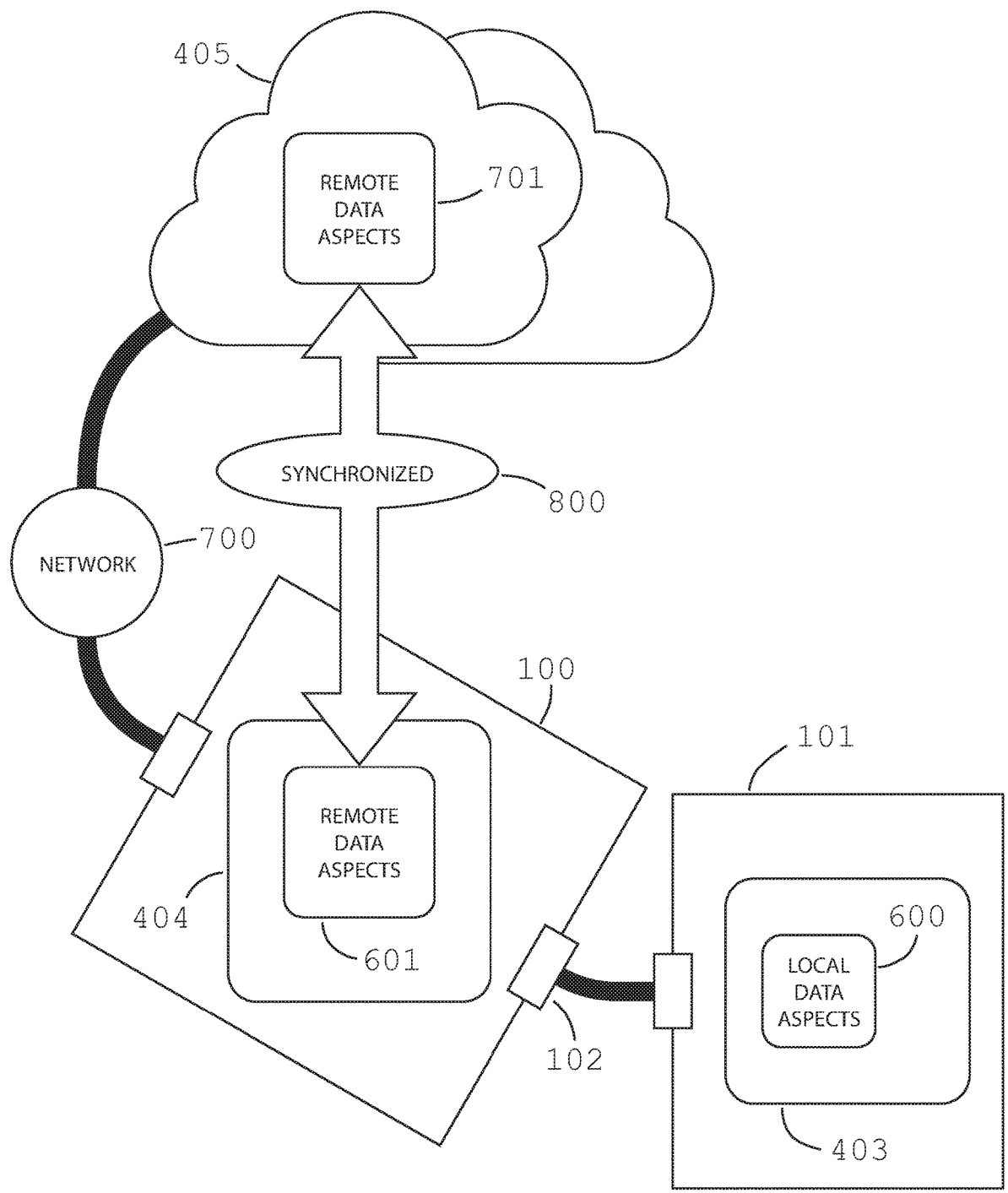
FIG. 8 illustrates the physical separation between local data aspect storage space and network attached remote data storage space, wherein a complementary locality of reference is afforded by virtue of synchronization, in an embodiment.

FIG. 8 depicts an embodiment in which aspects of the invention bind the local portable data storage device 101 to remote data storage space, wherein remote data aspects 601 are maintained as synchronized copies 701 in region 405 of remote data storage space located physically distant from host computer 100 (e.g., cloud storage). In an embodiment, host computer 100 executes synchronizing agent software in addition to the emergent data file storage system application software. In other embodiments, a synchronizing agent is incorporated into the emergent data file storage system application software. An exemplary advantage gained by the complementary locality of reference illustrated in FIG. 8, is continued access to the emergent data file storage system in the event that connection between host computer 100 and network connections 700 is lost. Another exemplary advantage gained by this arrangement is continued access to the same emergent data file storage system on another computing platform so synchronized with the same remote data storage space. Another exemplary advantage gained by the arrangement is high-speed access to remote data aspects 601, independent of separate synchronization 800. Another exemplary advantage gained by this arrangement is the potential recovery of remote data aspects 601 or 701, in the event of a loss of either (e.g., host computer failure).

The emergence of a data object from the emergent data file storage system is a function of operations on a data aspect pair by an instance of a transforming process. Constituents of the emergent data file storage system do not have separately identifiable paths because they are not stored in physical locations. For each data file or directory node, software application 200 separately retrieves a local data aspect from local data storage space 401 and a remote data aspect from one or more regions of remote data storage space 402. In an embodiment, a data aspect pair may represent multiple data objects.

Similar to hierarchical disk file systems, directory nodes of the emergent data file storage system contain information about constituents; both emergent files and subdirectory nodes. As further described herein, information needed to generate a data object from a data aspect pair (e.g., the identity of blocks of data comprising a data aspect pair) is itself stored in the emergent data file storage system. A transforming process operative upon the data aspect pair corresponding to a parent directory node results in the emergence of information (e.g., process parameters) needed to generate a constituent data object. A recursive descent of parent transforming processes is therefore required to identify and to generate data objects corresponding to constituents of the emergent data file storage system. Accordingly, aspects of the invention bind the local portable data storage device to remote data storage via the emergent data file storage system.

Figure 9:
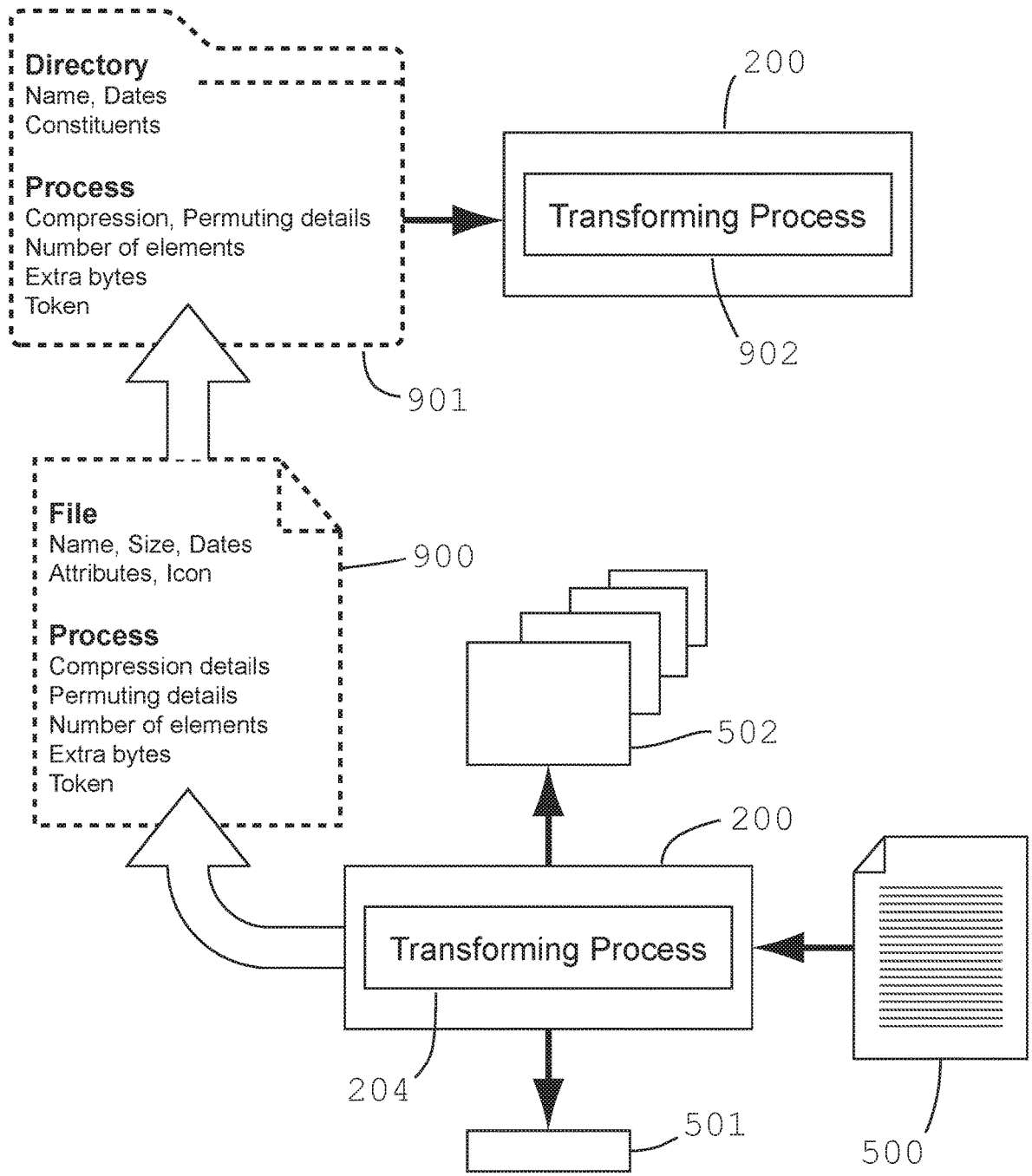
FIG. 9 illustrates the diffusion of process information into parent directory nodes in accordance with aspects of the invention.

FIG. 9 illustrates an instance of information 900 to be stored in a parent directory node 901. Information 900 includes information about original file 500 taken together with parameters of transforming process 204, in accordance with aspects of the invention. An original data file 500 is input to software application 200, but represents any original data input. Original data file 500 contents are provided by software application 200 to transforming process 204. The generation of local data aspect 501 and of remote data aspect 502 by transforming process 204 entails a variety of details herein referred to as process parameters. As shown, process parameters include information about the compress operation, the permute operation, the divide and generate operations, a token for retrieving the local data aspect, and extra bytes. Extra bytes represent any data that did not enter into the generation of a data aspect pair, although necessary when later generating a data object having content substantially identical to original file 500. Parent directory node 901 is associated with the generation of another data aspect pair not shown; unique to transforming process 902 with its own parameters.

Figure 10:
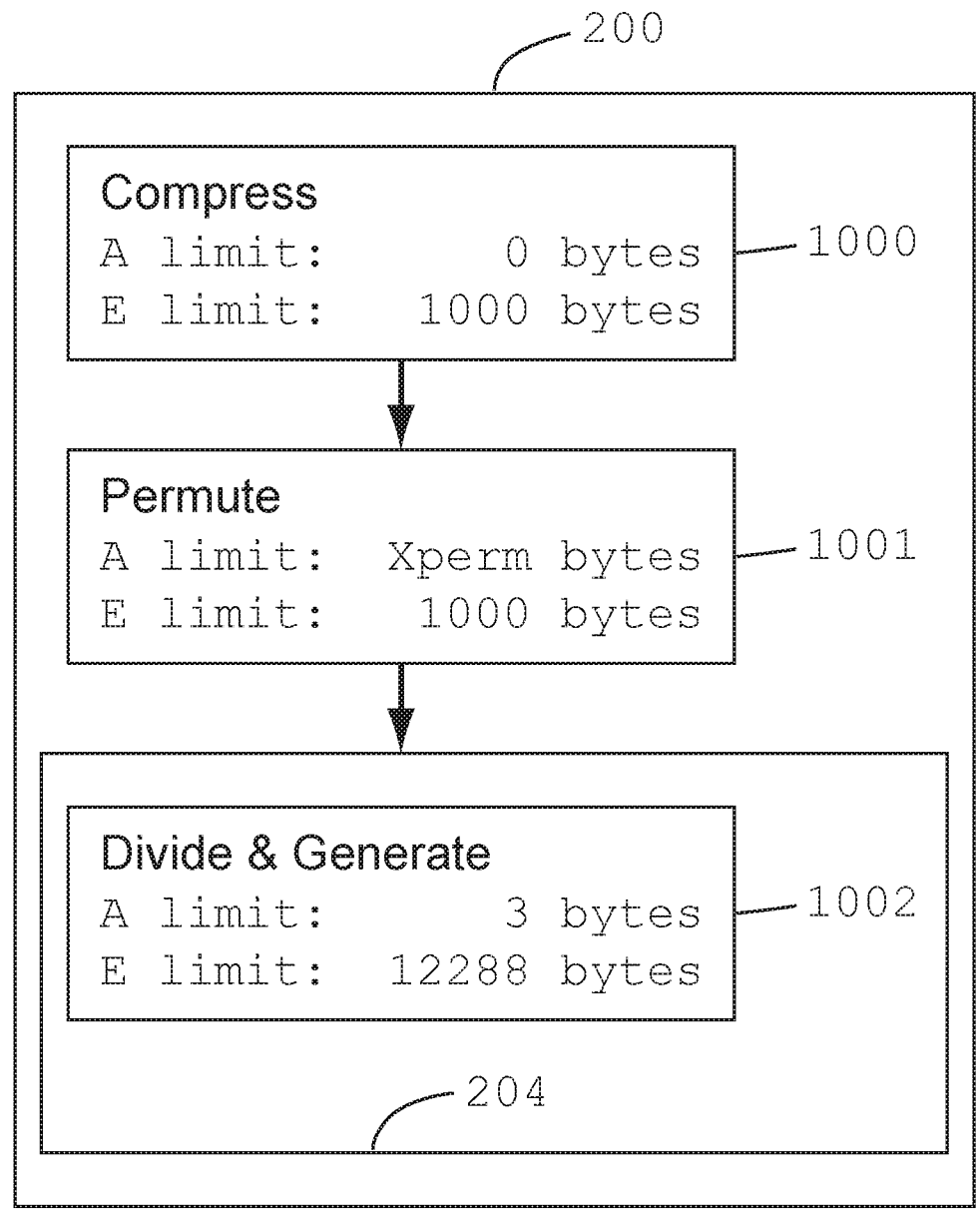
FIG. 10 illustrates operation components of an exemplary software application executing the emergent data file storage system.

FIG. 10 illustrates the absolute limit (i.e., "A limit") and the efficiency limit (i.e., "E limit") of minimum input data length for each of the operations associated with a transforming process. One of ordinary skill in the art will understand that the limits of minimum input data length shown are exemplary and may be more or less in accordance with aspects of the invention. The divide and generate operations 1002 generates a data aspect pair, and is the principle component of a transforming process. In an embodiment, the compress operation 1000 and the permute operation 1001 are preliminary operations not directly involved in the divide and generate operations 1002. Software application 200 performs I/O operations for reading and writing data files. The input data of the compress operation 1000 is the output data of the read operation of software application 200 executing on host computer 100. Contingent upon input data length, the output data of the compress operation 1000 is input data to the permute operation 1001. Contingent upon input data length, the output data of the permute operation 1001 is input data to divide and generate operations 1002. Contingent upon input data length the output data of divide and generate operations 1002 is a data aspect pair.

Referring again to FIG. 10, each operation is shown with an absolute limit of minimum input data length; the minimum length of input data necessary to function. The efficiency limit of minimum input data length of each operation is the minimum length of input data that justifies the practicality of the operation, distinct from the absolute limit of minimum input data length. The compress operation 1000 performs data compression on data originating from the software application 200 I/O read operation. A multitude of data compression means are available which will function properly even given input data of zero length. The length of output data will, however, be at least that of the length of certain overhead data. Therefore, it is not efficient to compress input data of less than 1,000 bytes. One of ordinary skill in the art will understand that the 1,000 bytes efficiency limit of minimum input data length of the compress operation 1000 is exemplary, and may be more or less than 1,000 bytes depending on the compression means utilized. Input data of length less than the efficiency limit of minimum input data length of the compress operation 1000, is referred to as scant. In an embodiment, scant input data is moved to the parent directory node and does not undergo compress operation 1000. When compress operation 1000 is performed, the output data length may be greater than or less than the input data length. Data compression identifies occurrences of statistical redundancy within the input data, and then replaces each with a token shorter than the data that it represents. If the compress operation 1000 performs compression of input data containing little or no statistical redundancy (e.g., already compressed input data), the output data length will be greater than the input data length. If the compress operation 1000 performs compression of input data containing statistical redundancy, the output data length will be less than the input data length by an amount indicative of the statistical redundancy. Therefore, even given input data of length justifying compress operation 1000, it is possible that the output data length of compress operation 1000 will be less than that which justifies permute operation 1001.

Referring again to FIG. 10, the absolute limit of minimum input data length of permute operation 1001 is the number of segments into which the input data is permuted (i.e., "Xperm"). The efficiency limit of minimum input data length of permute operation 1001 is 1,000 bytes, as shown. One of ordinary skill in the art will understand that the 1,000 bytes efficiency limit of minimum input data length of permute operation 1001 is exemplary, and may be more or less than 1,000 bytes depending on the number of segments into which the input data is permuted.

Referring again to FIG. 10, the absolute limit of minimum input data length of divide and generate operation 1002, is the fewest number of elements from which a second set of data can be generated. The efficiency limit of minimum input data length of divide and generate operation 1002 is 12,288 bytes, as shown. One of ordinary skill in the art will understand that the 12,288 bytes efficiency limit of minimum input data length of divide and generate operation 1002 is exemplary, and may be more or less in accordance with data storage operations. By way of example and not limitation, the allocation unit size of a modern file system is 4,096 bytes. An input data length of 12,288 bytes can be divided into the fewest number of elements, each having a length equal to the allocation unit size.

When an original data file is processed in totality by a single instance of transforming process 204, and the length of input data is at least that of the efficiency limit of minimum input data length for each of the operations in FIG. 10, the original data file is regarded as having an intermediate length. When an original data file is not processed in totality by a single instance of transforming process 204, the original data file is regarded as very large. One of ordinary skill in the art will understand that a determination by software application 200 to process an original data file in totality by a single instance of transforming process 204, is dynamic and based on several factors. An original data file of zero length (i.e., an empty file), an original data file having scant contents, an original data file of intermediate length, and a very large original data file, each serve as an original input data file in one or more of the embodiments further described below.

Figure 11:
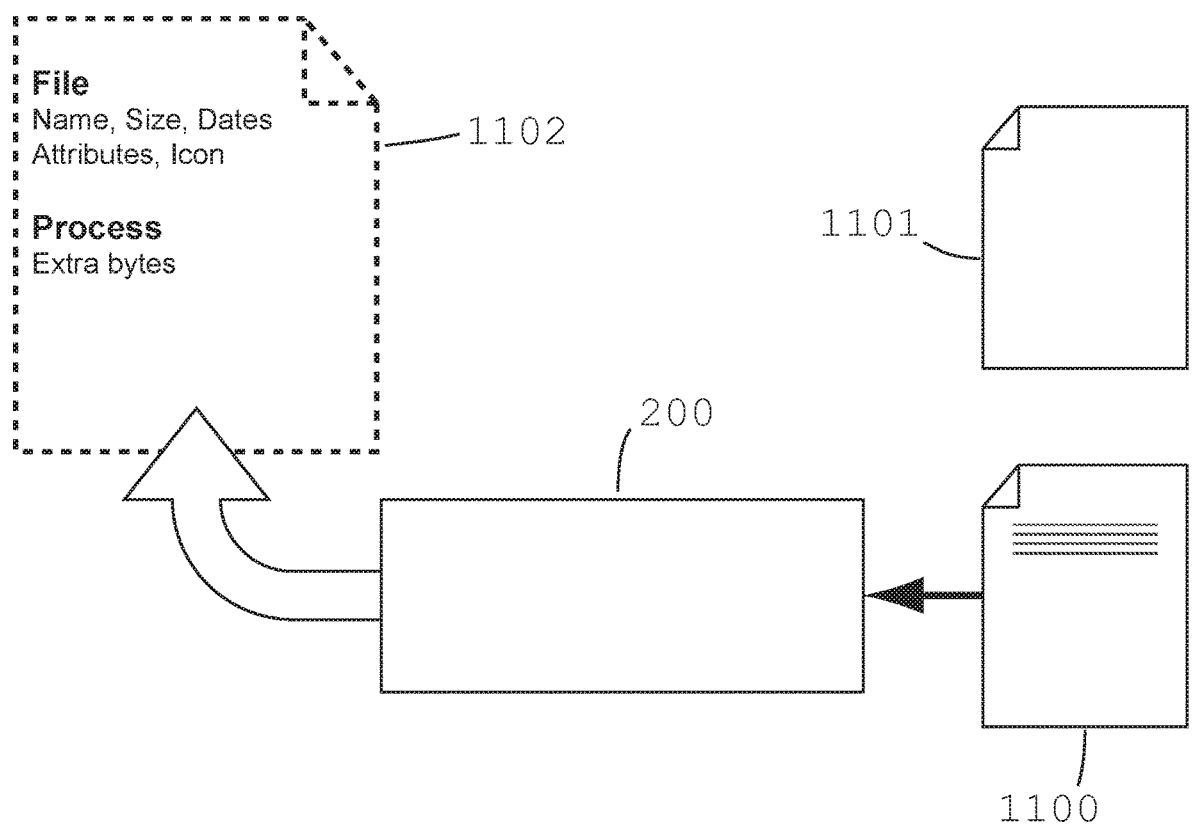
FIG. 11 illustrates steps associated with the processing of empty data files and of tiny data files, in accordance with an exemplary embodiment.

FIG. 11 illustrates an instance of information 1102 associated with an embodiment in which the contents of an original data file 1100 are scant and immediately of insufficient length to support a transforming process. Information about the data file is recorded in file information object 1102. The data file is read and the contents stored in file information object 1102 as extra bytes to support later data object generation. In a related embodiment, the original input data file 1101 has an input data length of zero (i.e., an empty file). Information about the data file is then recorded in file information object 1102 in the same way. However, when a data object having content, format and attributes substantially identical to the original data file is later generated from this information, it will be clear that extra bytes are not used because the length is equal to zero. The same file information object 1102 is stored in the parent directory node as before.

Figure 12:
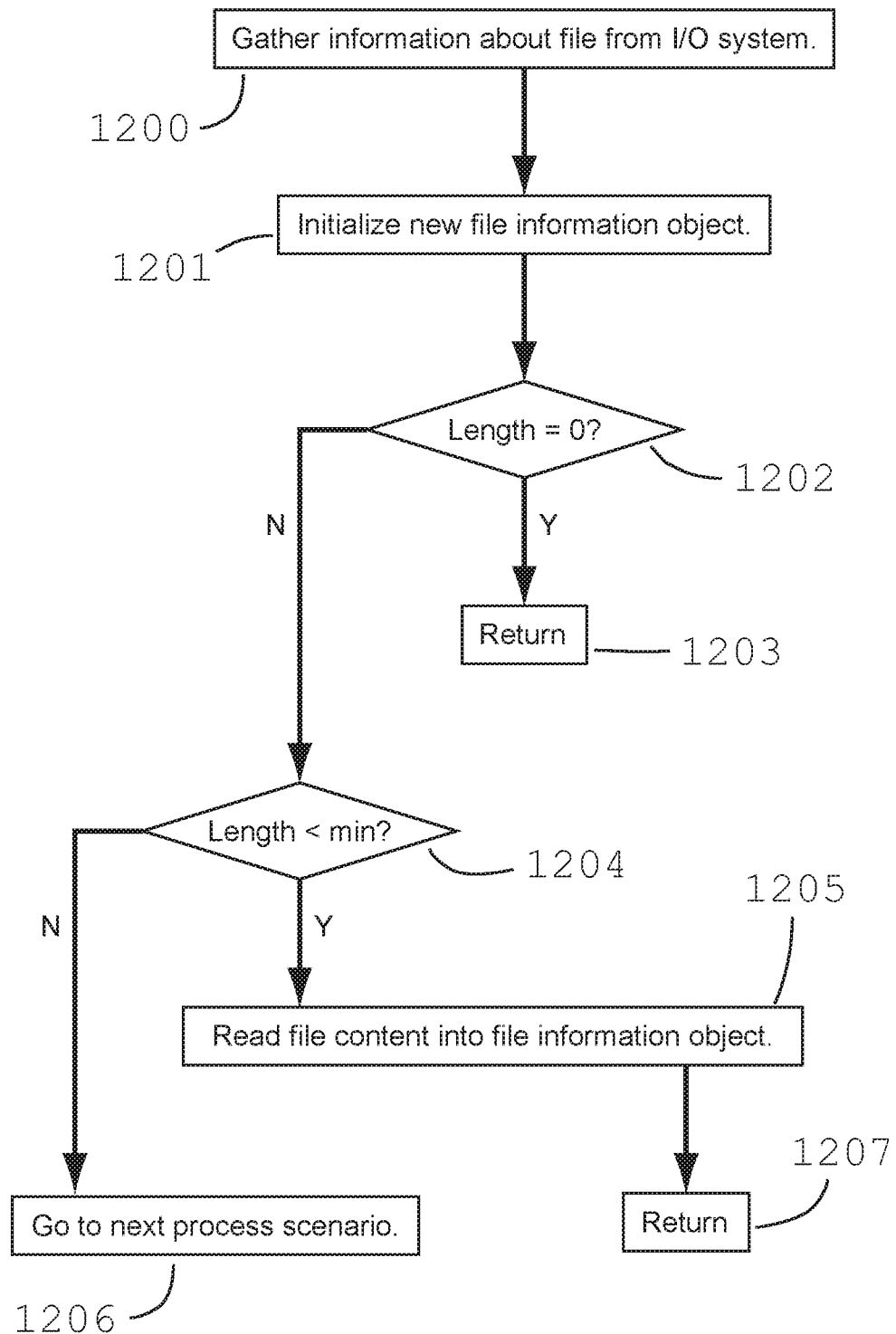
FIG. 12 is a flowchart of a method of processing empty data files and tiny data files, in accordance with an exemplary embodiment.

FIG. 12 is a flowchart of an exemplary method of processing data files having scant contents and immediately of insufficient length to support a separate transforming process, in accordance with an aspect of the invention. At step 1200, software application 200 executing on host computer 100 gathers information about an original data file. One skilled in the art will understand that information about a data file is readily obtained from a computing platform operating system. Specifically, the information can be obtained as the result of an I/O query. At step 1201, information about the original data file is stored in a new file information object 1102. If the length of the original data file is zero, a decision in step 1202 is made to return in step 1203, having only recorded information about the original data file. If the length of an original data file is not zero, but less than can be practically compressed, a separate determination in step 1204 is made to store the contents of the original data file in file information object 1102. Scant contents of an original data file are stored in file information object 1102 in step 1205, before returning to the parent process in step 1207. With sufficient content, however, the original input file is diverted in step 1206 to the next process scenario, that of step 1407 in FIG. 14.

Figure 13:
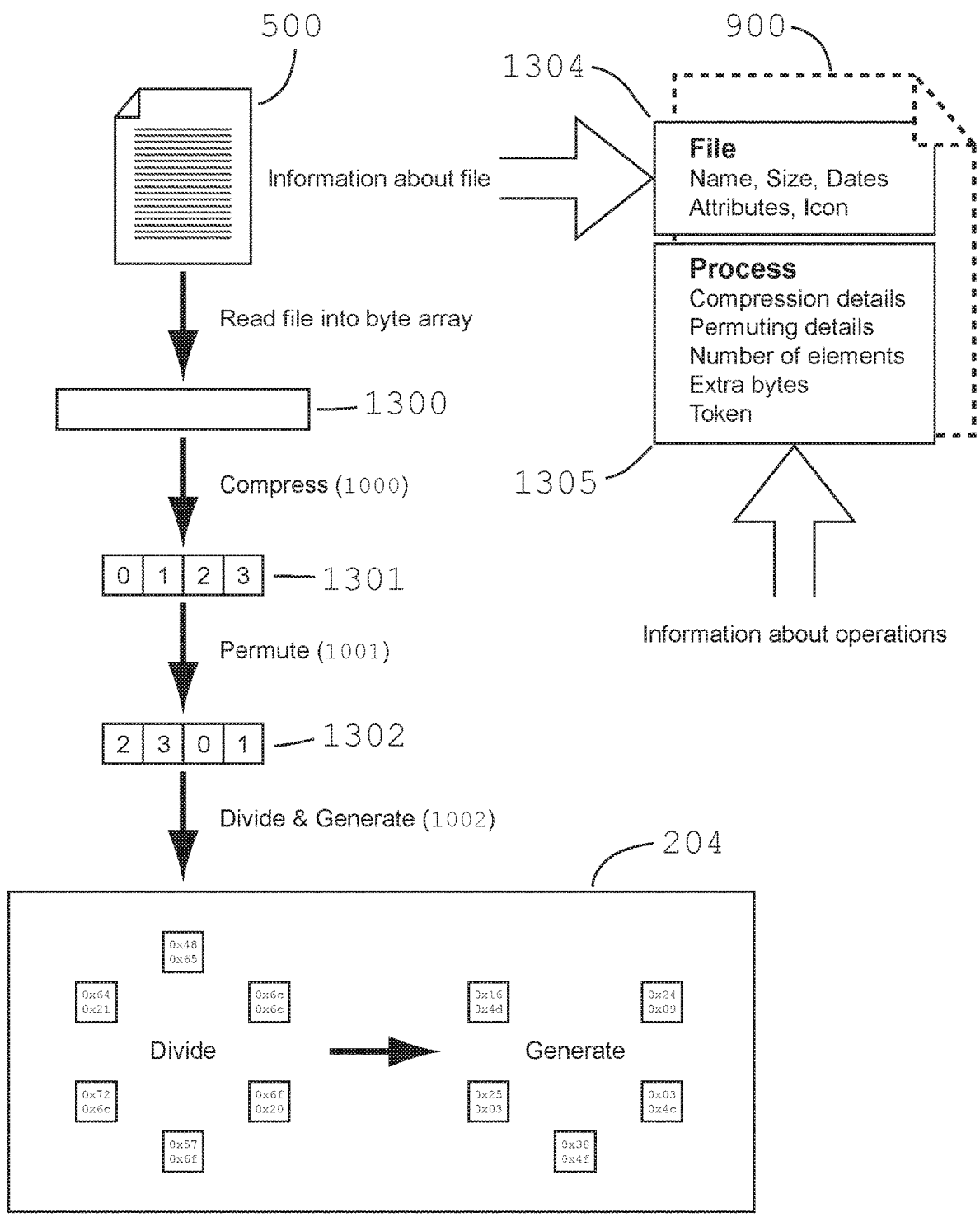
FIG. 13 illustrates steps associated with the processing of data files having an intermediate length, in accordance with an exemplary embodiment.

FIG. 13 illustrates steps associated with an embodiment in which the original input data file 500 is of intermediate length. Information 1304 about the original input data file 500 is stored in a new file information object 900. The contents 1300 of original input data file 500 is the input data to the compress operation 1000. In an embodiment, the compress operation 1000 is performed by software application 200 executing on host computer 100. One skilled in the art will understand that reading a data file and temporarily storing the contents so as to facilitate data compression, are operations regularly performed in random-access memory (i.e., RAM). A multitude of data compression means are available, each having advantages and disadvantages. For example, utilizing the Lempel-Ziv-Markov chain algorithm (i.e., LZMA) may result in a higher compression ratio, but execution time is comparatively longer than an alternative Deflate compression algorithm; a combination of the LZ77 algorithm and Huffman coding. One skilled in the art will understand that data compression delivers varying results depending on the compression means utilized, the length of a data file and the amount of statistical redundancy in the data file. Aspects of the present invention specify lossless compression means, regardless of the original input data file. The output data 1301 of the compress operation 1000, having sufficient length, is the input data to the permute operation 1001. The output data 1302 of the permute operation 1001, is the input data to the divide and generate operations 1002 of the transformation process 204. The divide and generate operations of the transforming process 204 are described in detail below. Information about operations performed in FIG. 13 (i.e., process parameters 1305) is also stored in the file information object 900.

Figure 14:
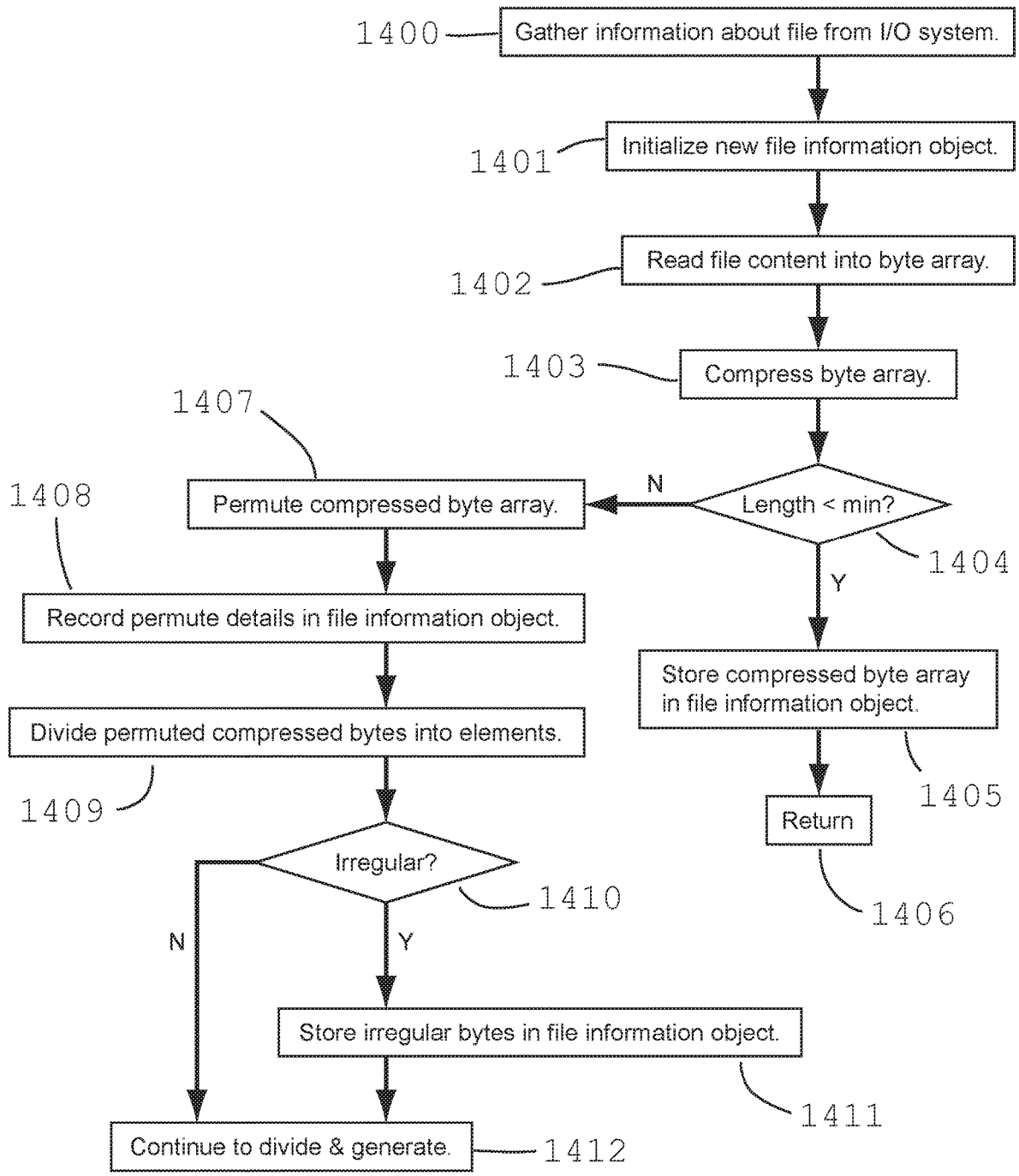
FIG. 14 is a flowchart of a method of processing data files having an intermediate length, in accordance with an exemplary embodiment.

FIG. 14 is a flowchart of an exemplary method of processing files of an intermediate length, in accordance with an aspect of the invention. At step 1400, the software application 200 executing on host computer 100 gathers information about the original input file 500 from the operating system (i.e., via I/O query). The same information serves to initialize a new file information object 900 in step 1401. The contents of the original input file 500 are read into temporary storage in step 1402, and then compressed in step 1403. In an embodiment, a filestream for reading a file is passed to a compression stream; the compression stream output is then transferred to a byte array. The compressed data corresponding to 1301 in FIG. 13 must be determined in step 1404 to be of sufficient length to support the remaining process steps. If the compressed data is insufficient to warrant the permute operation, the compressed data is stored in the file information object in step 1405, an operation similar to the storing of uncompressed original input file contents as extra bytes in file information object 1102 in FIG. 11. Differing results will be distinguished later when the recorded length of the original input file is compared to the length of extra bytes stored in the file information object. If compressed data is sufficient to proceed, information about the permuting step 1407 is also stored in the file information object in step 1408. The permuted compressed data is then divided into elements in step 1409. The determination is made in step 1410 of whether the division into elements was irregular. Irregular division into elements is discussed below, and the results are stored in the file information object in step 1411 before continuing to the arranging of elements into cyclic order in step 1412, discussed below.

FIG. 15 presents source code useful in implementing a type of seeded pseudo-random number generator (i.e., PRNG). In an embodiment, a PRNG is assigned two roles: generating unique names for each block of one or more blocks comprising a remote data aspect, and generating reversible sequences useful in permute operations. Where the chief purpose of data compression is to increase efficiency, the chief purpose of permute operations is to reduce determinism of data aspect pair generation. One skilled in the art will recognize several alternatives to the seeded PRNG presented in FIG. 15, such as the Mersenne Twister. A seeded PRNG is specified for producing an output sequence that may later be repeated if initialized with the same seed value. The type of PRNG presented in FIG. 15 is the XOR-rotate-shift-rotate; Xoroshiro128 in particular, considered exemplary for an especially efficient use of memory. An object-oriented class given the name "Xoroshiro128" is defined beginning on line 000. One skilled in the art will recognize that the class constructor beginning on line 002 has one argument—the given seed. Once instantiated, an object of this class will successively return 64-bit output values each time the method "Next" defined beginning on line 023 is invoked. The method "Next" is useful for generating a collision-resistant series of names. The method "NextInt" defined beginning on line 036 is useful in the permute operation, wherein successive values are needed, each confined to a window; a window defined by minimum and maximum values passed to the method as arguments.

FIG. 16 illustrates exemplary steps of permute operation 1001 and the application of a PRNG. In an embodiment, the PRNG and the permute operation 1001 are performed by software application 200 executing on host computer 100. The input data 1301 of permute operation 1001, is the output data of the compress operation 1000 in FIG. 13. In an embodiment, the input data 1301 represents the totality of original data file 500 contents. In other embodiments, the input data 1301 represents one of a multitude of compress operation output data, when the original data file is very large. As shown in FIG. 16, the input data 1301 is divided into four segments (i.e., 0, 1, 2 and 3). The output data 1302 of permute operation 1001 is input data 1301, reordered by segment. The exact length of input data 1301 is unspecified, and one of ordinary skill in the art will understand that the number of segments shown is exemplary and may be more or less in accordance with aspects of the invention. Reordering of segments is accomplished by applying the output of a PRNG to the ordered list of segments 1605 at each of the steps 1600, 1601, 1602 and 1603. The zero-based greatest index 1604 (i.e., "n") of the ordered list of segments 1605 is passed to the PRNG. The PRNG operation at each step 1606 returns a value between zero and n (i.e., window), and is the zero-based index into the ordered list from which a segment number is removed to the unordered list of segments 1607. Ordered and unordered lists are comprised of two columns. The left column is the zero-based index of the list at each instance. The right column is the zero-based index of the segment of input data 1301 to which it corresponds. At each step, the length of the ordered list of segments 1605 decreases by one, and the length of the unordered list of segments 1607 increases by one. The length of the ordered list to begin is equal to the number of segments. The length of the unordered list is equal to the number of segments at the end. In the last step, the single index remaining in the ordered list is removed to the unordered list without invoking the PRNG. For each permute operation 1001, the total number of PRNG operations is one less than the number of segments. One skilled in the art will understand that ordered and unordered lists may be mutable or immutable. In an embodiment, input data 1301 is not rearranged at each step. Instead, the unordered list of segments is used by transforming process 204 to translate operations on input data 1301, and the output data 1302 of permute operation 1001 in FIG. 16 is only representative of permute operation results.

FIG. 17 presents source code useful in implementing a permuter. An object-oriented class given the name "Permuter" is defined beginning on line 000. One skilled in the art will recognize that the class constructor beginning on line 006 has one argument—the input data, corresponding to input data 1301 of permute operation 1001 in FIG. 13. Once instantiated, an object of this class returns the Boolean result of permute operation 1001, each time the method "Permute" defined beginning on line 011 is invoked. The permuted output data is returned by reference. Field "Xperm" shown on line 002, is assigned the value of 4 which is the number of segments into which input data 1301 will be permuted. One of ordinary skill in the art will understand that the value of 4 is exemplary and may be more or less in accordance with aspects of the invention. Assigned a value of 4 as shown, the total number of possible permutations of the input data is 4 Factorial (i.e., 4!), or 24. The number of segments can be adjusted for each input data 1301. The number of segments will inversely affect the length of each segment. The value assigned to "Xperm" is recorded in process parameters 1305 in FIG. 13. Method "Permute" beginning on line 011 has one argument—the already seeded PRNG. A division into elements is performed on lines 013 to 015. An irregular division into segments is referred to as a cap. A cap is smaller than a segment and handled separately. The ordered list "ints" defined on line 021 corresponds to the ordered list 1605 in FIG. 16, following the division into segments and the addition to the list of each in the "while" loop beginning on line 022. The unordered list "rints" defined on line 028 corresponds to the unordered list 1607 in FIG. 16. A call to the PRNG is shown on line 037 where it is passed the dimensions of the ordered list 1605 at each iteration 1606 in FIG. 16.

FIG. 18 illustrates the preparation of a first set of data in accordance with aspects of the invention. Trivial string 1800 (i.e., "Hello World!") is an exemplary first set of data representative of original input data in an embodiment. The American Standard Code for Information Interchange (i.e., ASCII) values in hexadecimal format of each character of the string are shown alongside. A total of twelve characters are divided into six elements, two characters for each element. The six elements 1801-1806 are then arranged in cyclic order; into positions 1-6, respectively. The first element 1801 is placed into the first position 1 at the top of the cycle and the last element 1806 is placed into the last position 6 to become the terminal element. Those skilled in the art will understand that the arranging of elements into cyclic order as shown in FIG. 18, is illustrative and representative only. References to a terminal element should not be interpreted in a limiting way by rigidly specifying the order in which elements are arranged, or the order in which operations are performed between them. The arranging of elements of a data set is best coordinated with the reading and writing of a data file. Generally, terminal refers to an element of the first set of data separated from input data last, and the last element on which an operation is performed in the generation of a second set of data.

Figure 19:
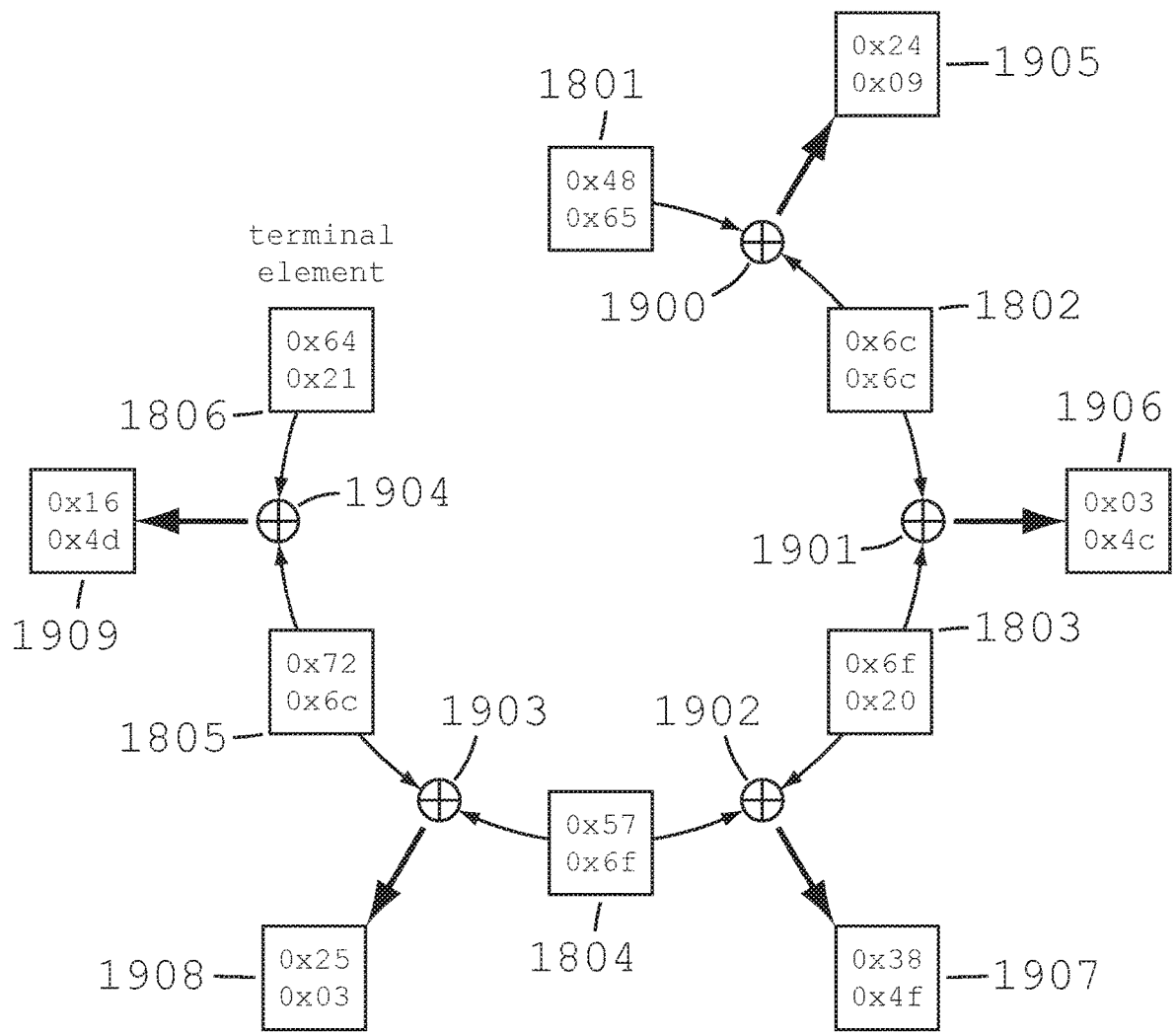
FIG. 19 illustrates the generation of a second set of data and its relationship to the local data aspect and to the remote data aspect, of an embodiment.

FIG. 19 is a continued illustration of the arrangement in FIG. 18, and of operations performed in the generation of a second set of data. The second set of data 1905-1909 is generated by performing addition modulo-2 logical operations 1900-1904 between adjacent elements of the first set of data 1801-1806. The second set of data is nontransitive; each element being unaffected by other results. The order in which operations are performed is not limited to that suggested by the numbering of elements and the operations in FIG. 19, and is best coordinated with the reading and writing of a data file. Element 1905 of the second set of data is generated by operation 1900 on adjacent elements 1801 and 1802 of the first set of data. Element 1909 of the second set of data is generated by operation 1904 on adjacent elements 1805 and 1806 of the first set of data. A closing operation is not performed between the elements 1806 and 1801. A cycle of n elements is therefore associated with a second set of data having (n−1) members.

Figure 20:
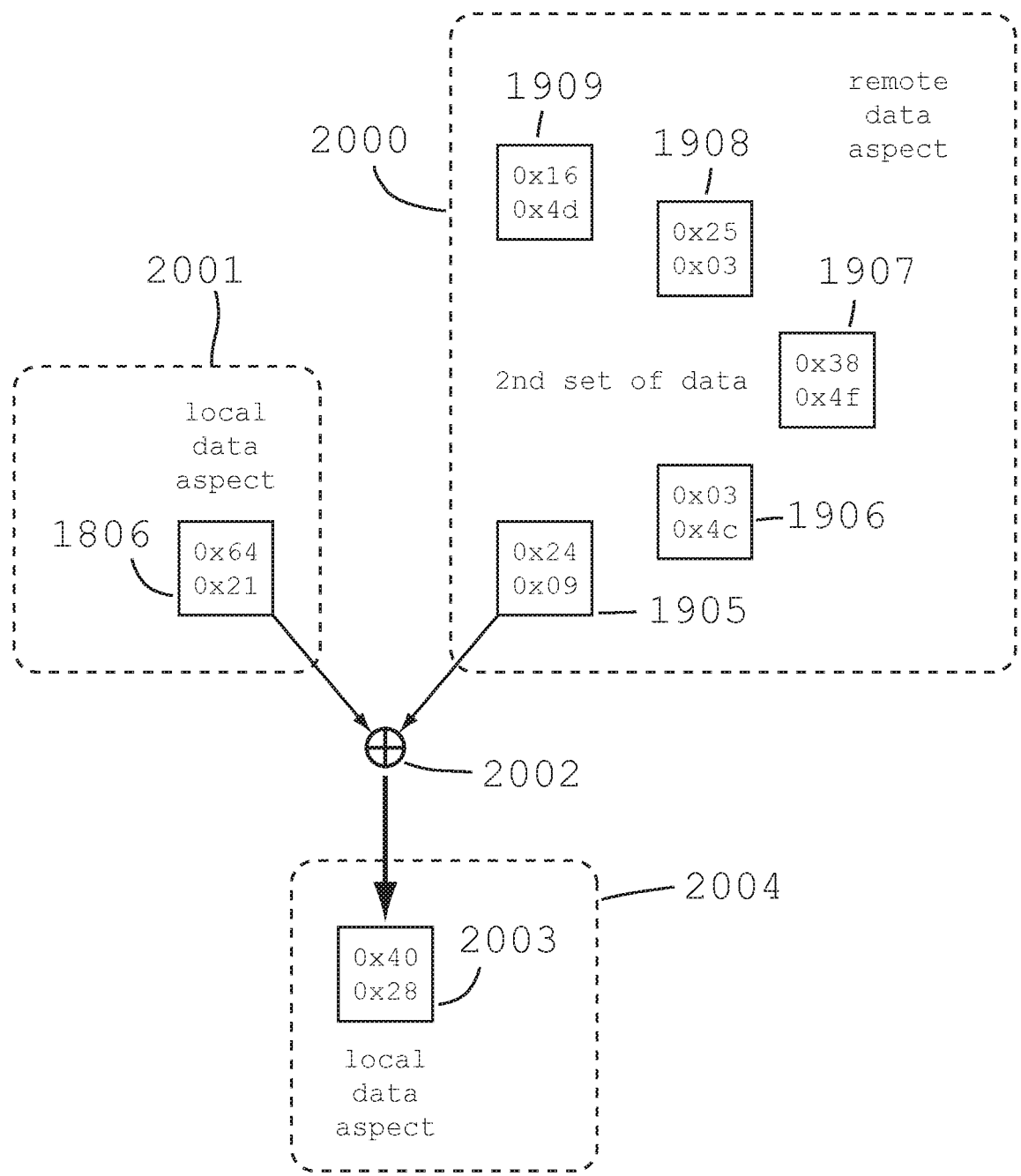
FIG. 20 illustrates terminal operations on the local data aspect, in accordance with an embodiment.

FIG. 20 illustrates the organization of the second set of data 1905-1909 shown generated in FIG. 19, into the remote data aspect 2000. Terminal element 1806 remains unchanged from the first set of data and becomes the local data aspect 2001. In an embodiment, the addition modulo-2 logical operation 2002 is performed between the terminal element 1806 and a nonadjacent member 1905 of the second set of data, to instead become the local data aspect 2004 comprised of element 2003.

Figure 21:
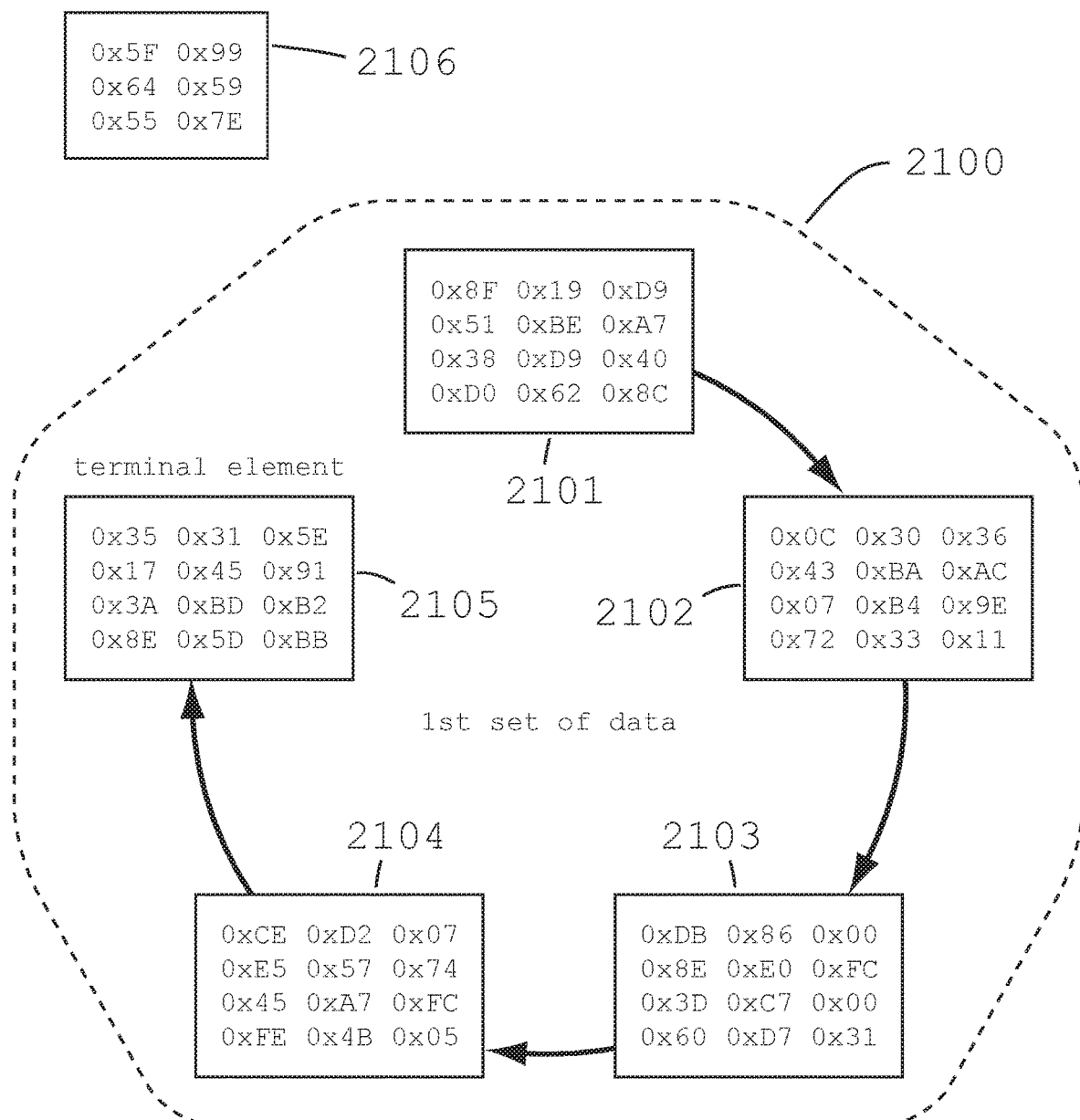
FIG. 21 illustrates an example of the preparation of a first set of data and aspects of the invention associated with an irregular division into elements.

FIG. 21 illustrates an example of the irregular division of input data with a length of sixty-six, into a first set of data 2100 comprised of five elements of equal length. Those skilled in the art will understand that input data having a length of sixty-six is introduced in FIG. 21 for illustrative purposes only, and representative of a transforming process encountering the irregular division of input data into a predetermined number of elements. Irregular bytes 2106 of length six are first separated from the input data and are stored in the file information object in the parent directory node. Division of a data object with a length of sixty is then accomplished with five elements each with a length of twelve. The first set of data 2100 comprised of the five elements 2101-2105 are then arranged in cyclic order as shown.

Figure 22:
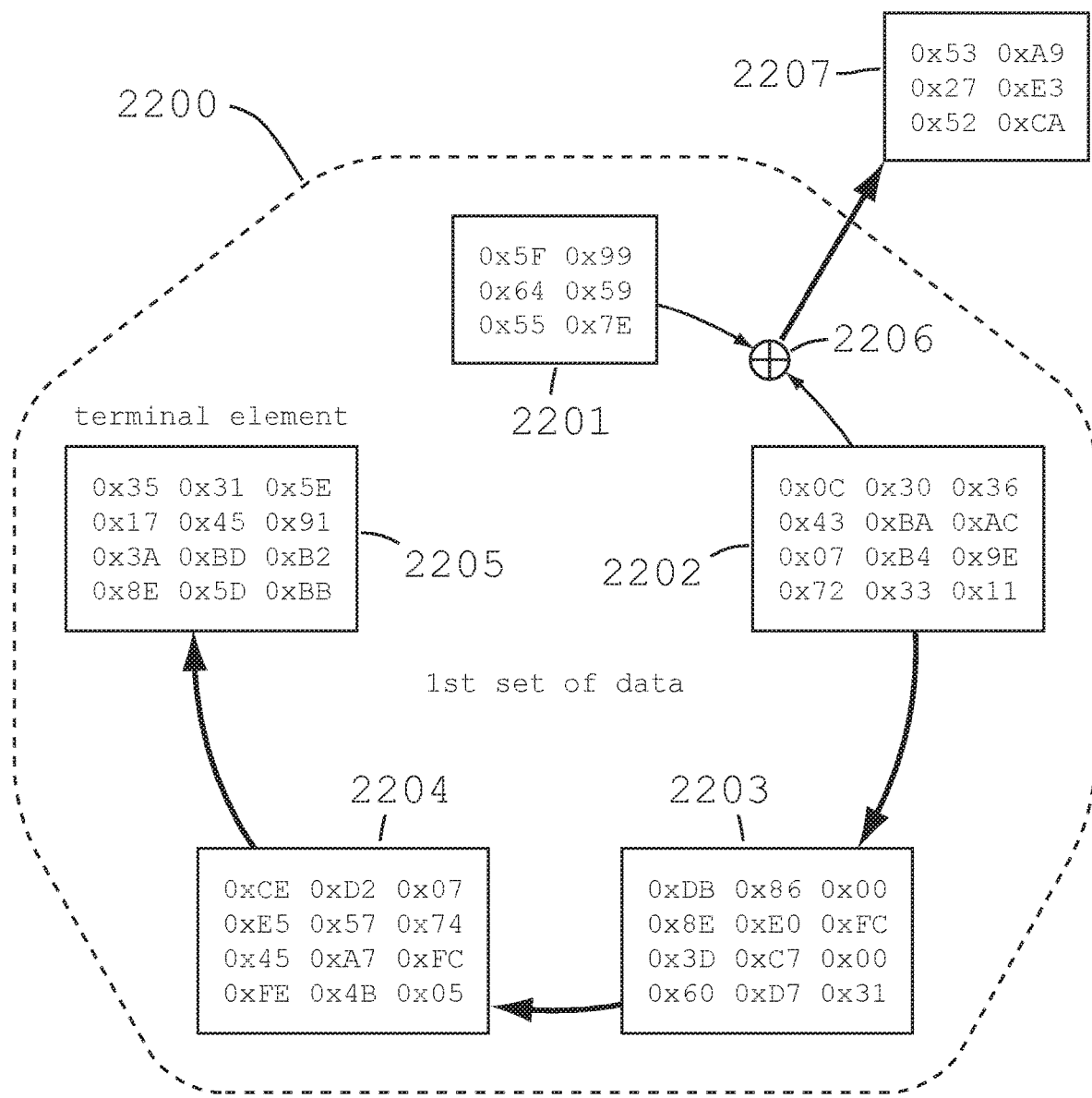
FIG. 22 illustrates another example of the preparation of a first set of data and aspects of the invention associated with an irregular division into elements.
Figure 23:
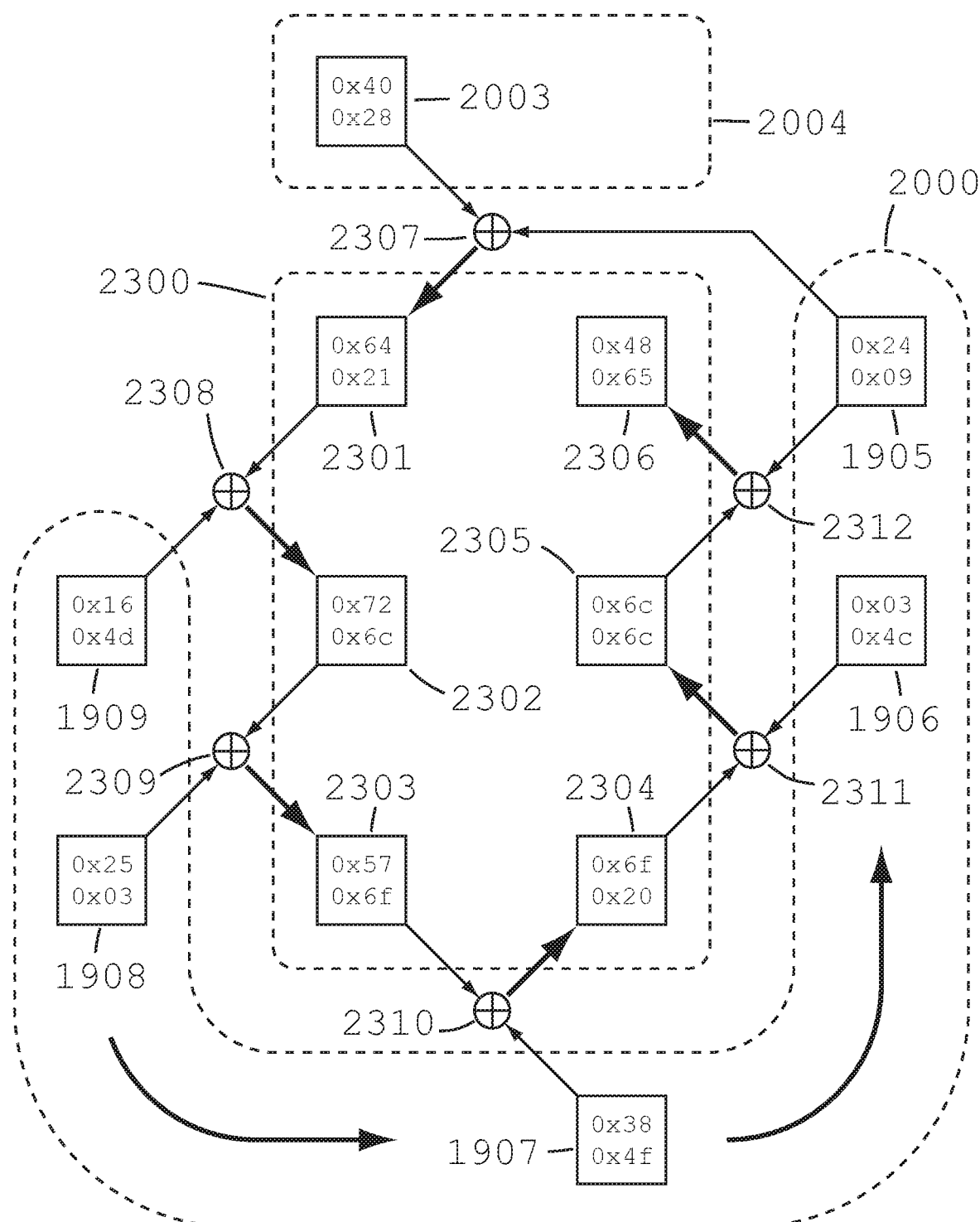
FIG. 23 illustrates the generation of a data set with content substantially identical to a first set of data corresponding to original data input, of an embodiment.

FIG. 22 illustrates an example of the irregular division of input data with a length of fifty-four, into a first set of data 2200 comprised of five elements of unequal length. Those skilled in the art will understand that input data having a length of fifty-four is introduced in FIG. 22 for illustrative purposes only, and representative of a transforming process encountering the irregular division of input data into a predetermined number of elements. As an alternative to the storing of irregular bytes in the file information object in the parent directory node as illustrated in FIG. 21, elements arranged in cyclic order may be of unequal length under the following conditions. The lengths of elements must increase in the direction of operations and each generated member of the second set of data must have the same length as the lesser of the two elements of the first set of data between which an addition modulo-2 logical operation is performed. Meeting these conditions will ensure that no members of the second set of data contain information from the first set of data. As shown in FIG. 23, addition modulo-2 logical operation 2206 is performed on the first pair of adjacent elements, but the first element 2201 has a length of six and the second element 2202 has a length of twelve. Therefore, the generated member of the second set of data 2207 has a length of six.

FIG. 23 illustrates the generation of data set 2300 having content substantially identical to first set of data 1801-1806 of original input string 1800 introduced in FIG. 18. Element 2003 comprising local data aspect 2004 and corresponding second set of data 1905-1909 comprising remote data aspect 2000 generated in FIG. 19, are arranged in cyclic order as shown. Addition modulo-2 logical operation 2307 is first performed between element 2003 comprising local data aspect 2004, and the same nonadjacent member of the second set of data 1905 previously operated with in FIG. 20. The generated element 2301 is substantially identical to terminal element 1806 comprising original local data aspect 2001. Addition modulo-2 logical operation 2308 is then performed between generated element 2301 and the next second set of data element 1909, thereby generating the next member of data set 2300, element 2302, which is substantially identical to first set of data element 1805. Operations continue between generated members of data set 2300 and adjacent elements of the second set of data as shown. The last generated member of data set 2300, element 2306, which is substantially identical to first set of data element 1801, results from addition modulo-2 logical operation 2312 between the same element 1905 first involved in operations with the local data aspect, and the previously generated member of data set 2300, element 2305.

Figure 24:
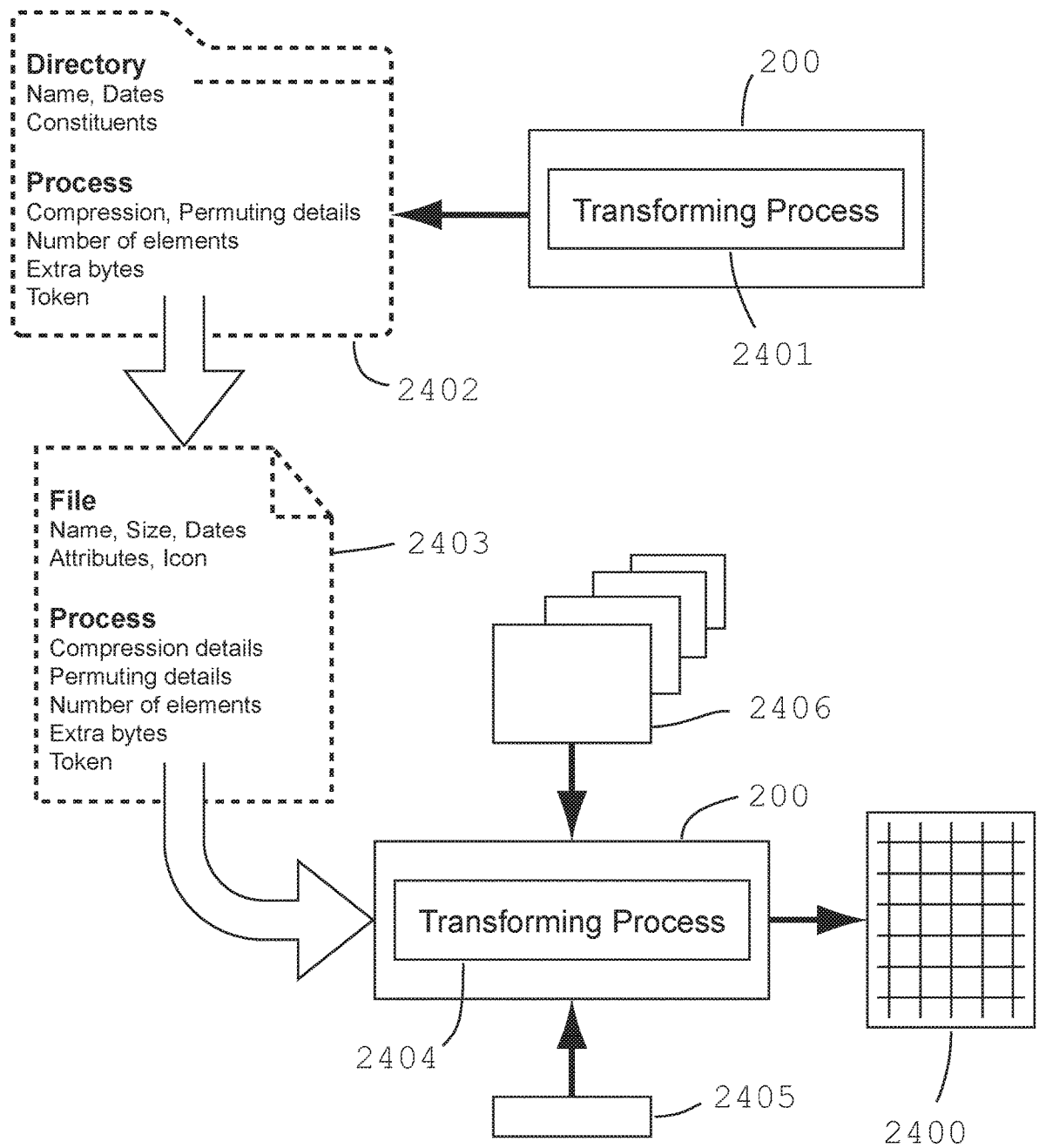
FIG. 24 illustrates steps associated with data object generation, in accordance with an exemplary embodiment.

FIG. 24 illustrates a process associated with disk file generation, in accordance with an exemplary embodiment. The process illustrated in FIG. 24 is essentially the reverse of the process illustrated in FIG. 9. Parent transforming process 2401 resolves data object 2402, an emergent directory node containing file information object 2403. In accordance with parameters contained in file information object 2403, software application 200 retrieves local data aspect 2405 and remote data aspect 2406, providing the data aspect pair to transforming process 2404. In accordance with parameters contained in file information object 2403, transforming process 2404 resolves data object 2400 which is then output by software application 200. In an embodiment, data object 2400 corresponds to an emergent data file storage system constituent. Alternatively, data object 2400 corresponds to a terminal accumulation associated with the processing of very large data files, described in greater detail below.

In an embodiment, an addition modulo-2 logical operation is performed between the terminal element of the first set of data and one or more nonadjacent members of the second set of data, as illustrated in FIG. 20. Following the terminal operation, demarcation between the local data aspect and blocks of data comprising the remote data aspect may be realigned. It is within the scope of the present invention that a local data aspect is transferred to and retrieved from remote data storage space and a remote data aspect is transferred to and retrieved from local data storage space. For example, one skilled in the art will readily envision exchanging data storage spaces assigned to the remote data aspect and the local data aspect of a particular data aspect pair. The option to modify transference is made possible following the terminal operation and forms the basis of an embodiment in which a process responsive to resource constraints may be implemented. Critical demarcation entails the enforcement of physical separation between a local data aspect and blocks of data comprising a remote data aspect, whereby it is maintained that blocks of data comprising either cannot be operated on to any extent resulting in determination of original input data.

Figure 25:
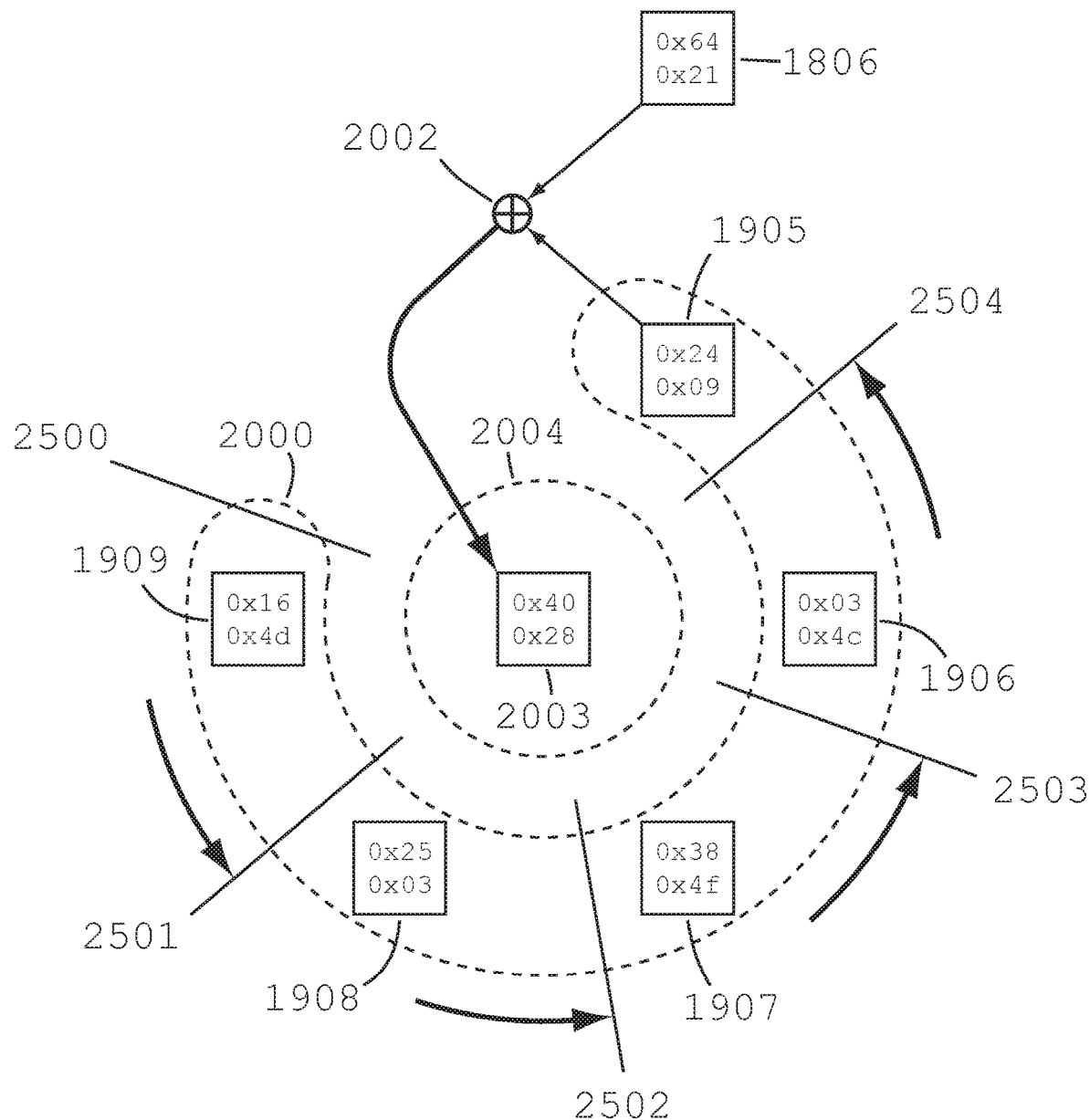
FIG. 25 illustrates a series of possible realignments of the demarcation between a local data aspect and blocks of data comprising a remote data aspect, subsequent to a terminal operation, in accordance with an embodiment.

FIG. 25 illustrates a series of possible realignments of the demarcation between local data aspect 2004 and blocks of data comprising remote data aspect 2000. Elements 1905-1909 are members of the second set of data 2000 generated in FIG. 19; individual blocks of data comprising the remote data aspect. The local data aspect 2004 is comprised of element 2003 previously generated by the addition modulo-2 logical operation 2002 between terminal element 1806 and nonadjacent member 1905 from the second set of data 2000, as shown in FIG. 20. In response to a constraint in either data storage space or data transfer time, demarcation between the local data aspect and blocks of data comprising the remote data aspect may be realigned to reapportion data transference in accordance with the constraint. Critical demarcation is a line of separation dividing the second set of data, without changing the order of elements, wherein the member of the second set of data which was involved in the terminal operation remains on the remote side of the line of separation. Element 1905 defines critical demarcation of the second set of data 2000 in FIG. 25. Therefore, reapportionment is valid to any of the points 2500-2503. Demarcation 2500 is associated with an exemplary data aspect transference described heretofore, wherein elements 1905-1909 are members of the second set of data 2000 comprising the remote data aspect. However, if demarcation is realigned to 2501, only elements 1905-1908 are transferred to remote data aspect storage space and element 1909 is transferred to local data storage space together with element 2003. If demarcation is realigned to 2504, element 1905 alone is transferred to remote data aspect storage space and elements 1906-1909 are transferred to local data storage space together with element 2003 comprising the local data aspect 2004.

Figure 26:
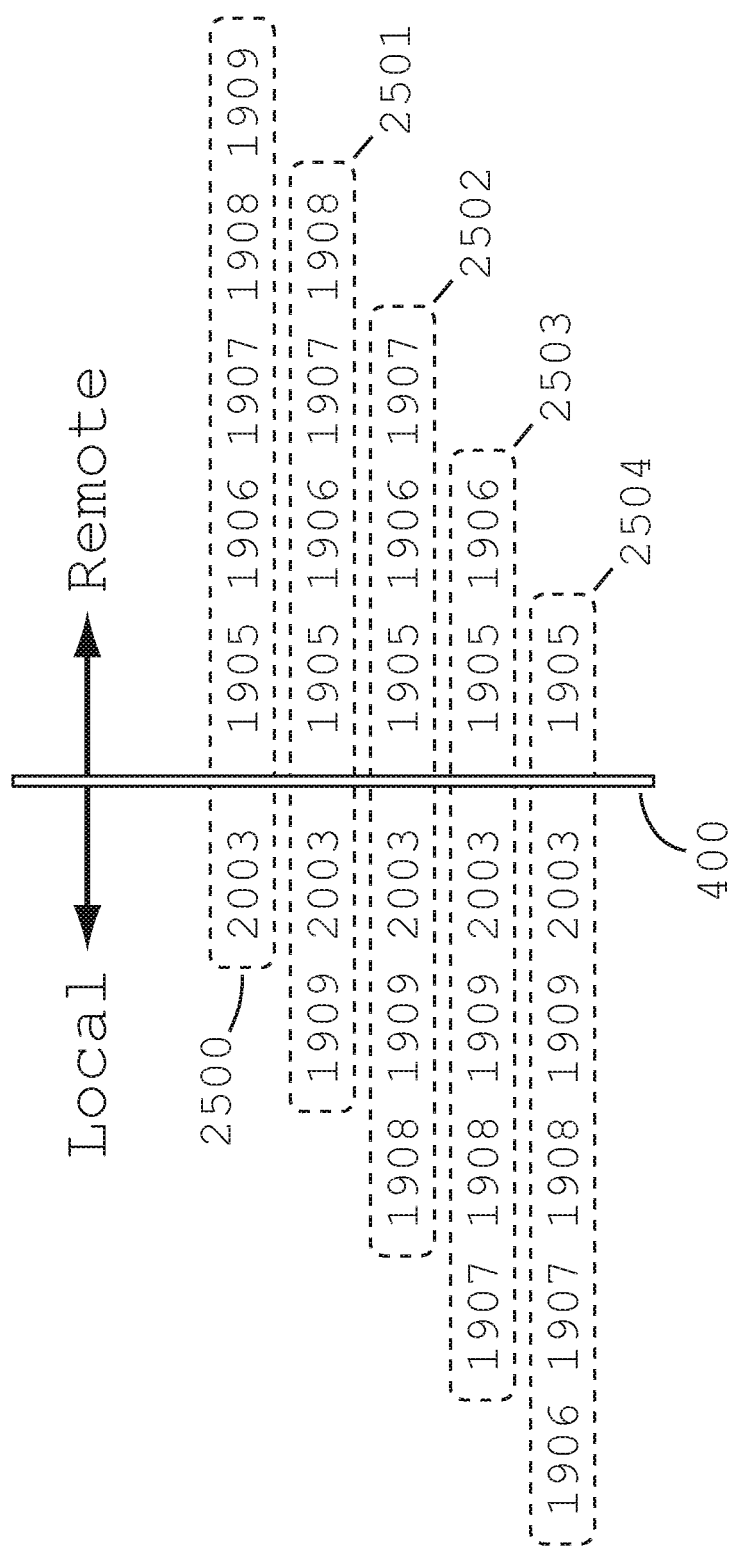
FIG. 26 presents in tabular form, the series of possible realignments of the demarcation illustrated in FIG. 25, and the differing reapportionment of data transference resulting from a varied response to resource constraints.

FIG. 26 presents in tabular form, the series of possible realignments of the demarcation illustrated in FIG. 25, and illustrates a modified transference associated with each. In accordance with an aspect of the invention, software application 200 responds to resource constraints by modifying transference of data elements to local data storage space and to remote data storage space, by selecting a realignment of demarcation. For example, transference can suffer from potential data transfer time constraints. Therefore, in response to a data transfer time constraint, software application 200 selects a realignment of demarcation consistent with the degree of data transfer time constraint. A flexible response to resource constraints is possible given the plurality of apportionments 2501-2504 corresponding to realignments of the demarcation. A type of data transfer time constraint may occur in which transference is subjected to a sudden and unexpected interruption. In this scenario, a data file can still be transformed and the corresponding emergent file committed to the emergent data file storage system without detriment, despite an abrupt realignment of demarcation. Efficiency is therefore increased by virtue of the substantially adaptive process, in accordance with aspects of the invention.

Generally, files of an intermediate length are associated with a single data object. For example, original data file 500 in FIG. 5 may correspond to data object 2400 in FIG. 24. As file length increases however, the expedience of processing data as a single block is overtaken at some point by practical limitations. Memory constraints imposed on the software application by the operating system may not permit very large data files to be processed in the same way. Moreover, a means of streaming the content of emergent video and audio file constituents of the emergent data file storage system must be contemplated. A requirement that these types of files be first processed in their entirety is precluded. FIGS. 27, 28, 29 and 30 are diagrams of steps taken to address this requirement, in an embodiment. One skilled in the art will understand that some aspects of the invention already presented will be absent from illustrations pertaining to the segmented processing of very large data files. For the benefit of clarity, permute operations are not shown, as also the storing in a file information object of processing parameters of individual blocks. In an embodiment, the segmented processing of a very large data file is computer-implemented, such as by host computer 102 executing application 200 to perform the steps and operations described.

Figure 27:
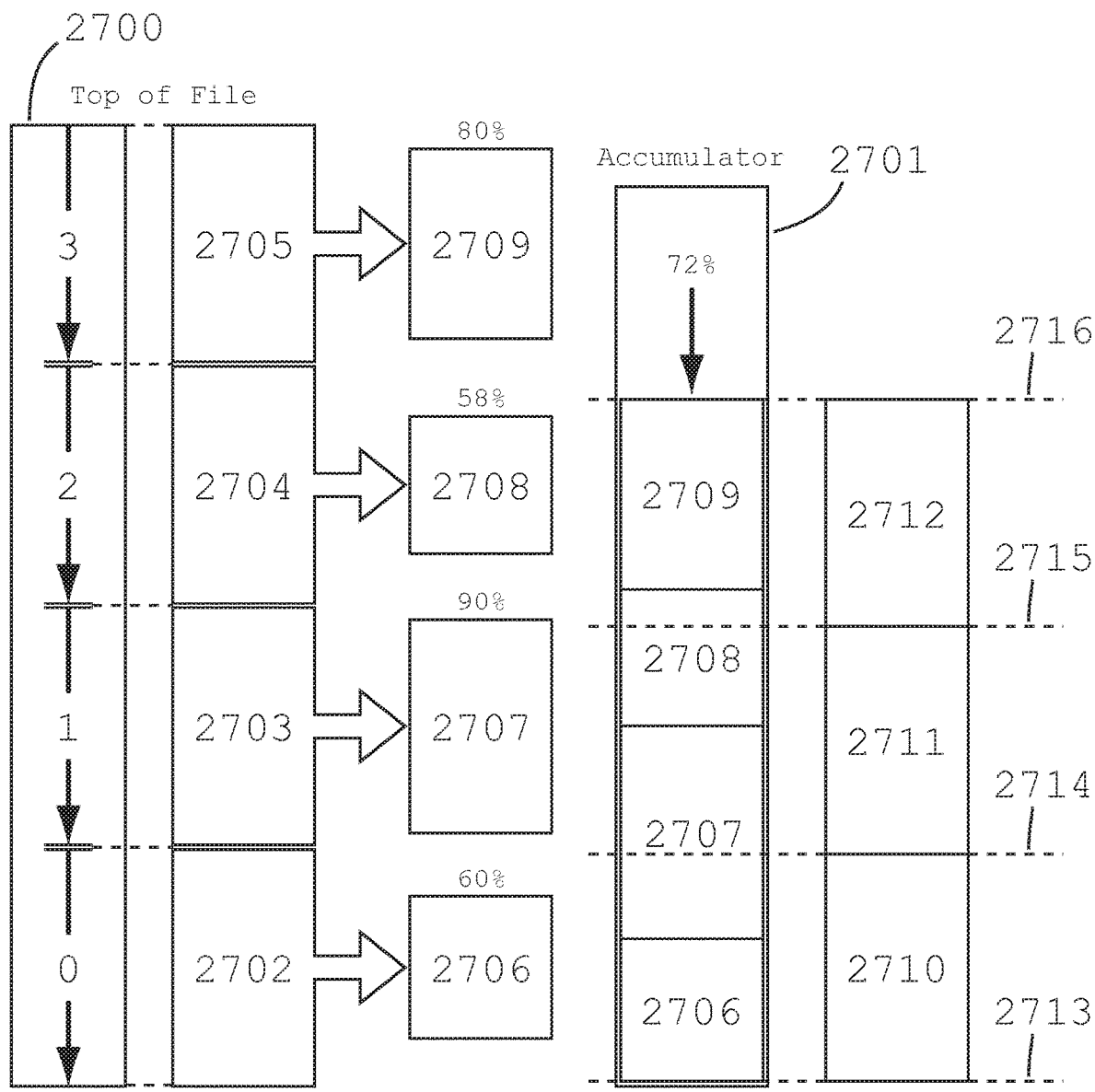
FIG. 27 illustrates process steps associated with the processing of very large data files, in accordance with an exemplary embodiment.

FIG. 27 illustrates the segmented processing of very large data file 2700. Individual blocks 0 to 3 are processed in reverse order to that when identical content is later generated. Blocks are individually compressed, as shown. The last block 2702 is aligned with the end of very large data file 2700, but is the first block read and becomes compressed block 2706 when compressed to 60%. Although blocks may be processed in reverse order, each block must be read in a forward direction. It is well-known to those skilled in the art that a "seek" command can be used to index a file pointer to a particular location in a file, but a "read" command is not used to read a file in reverse. Uncompressed block 2703 becomes compressed block 2707 when compressed to 90%. Uncompressed block 2704 becomes compressed block 2708 when compressed to 58%. Uncompressed block 2705 is aligned with the beginning of very large data 2700, but is the last block read and becomes compressed block 2709 when compressed to 80%. Those skilled in the art will understand that the number of blocks and the compression ratio of individual blocks is exemplary and representative of steps taken by a software application to process very large data files. Consistent with variations of content and of statistical redundancy in a very large data file, the compression ratio of individual blocks is expected to vary and is largely unpredictable. Compressed blocks are added to the queue-like accumulator 2701, in the same order as they are produced. A cumulative compression ratio of 72% represents the average of the compression ratio of individual blocks of compressed data 2706-2709. The accumulated total is then re-divided along lines of accumulation 2713-2716 which are distinct from the partitions between blocks of compressed data 2706-2709. In an embodiment, re-divided blocks are removed from the accumulator when a predefined level is reached. Predefined levels are unspecified, but are commensurate with a targeted block length. When a data file is processed at once, a single block is divided into elements of known size. When a data file is not processed at once, it cannot be known in the course of reading the data file what the results of compression will be for a block not yet reached. Therefore, a targeted block length is consistent with that of blocks of data comprising a remote data aspect associated with the processing of very large data files, and with audio and video files. As the top of very large data file 2700 is approached, software application 200 determines that the remaining accumulation must have a length equal to or greater than the targeted length, but less than twice the targeted block length, as represented by block 2712.

Figure 28:
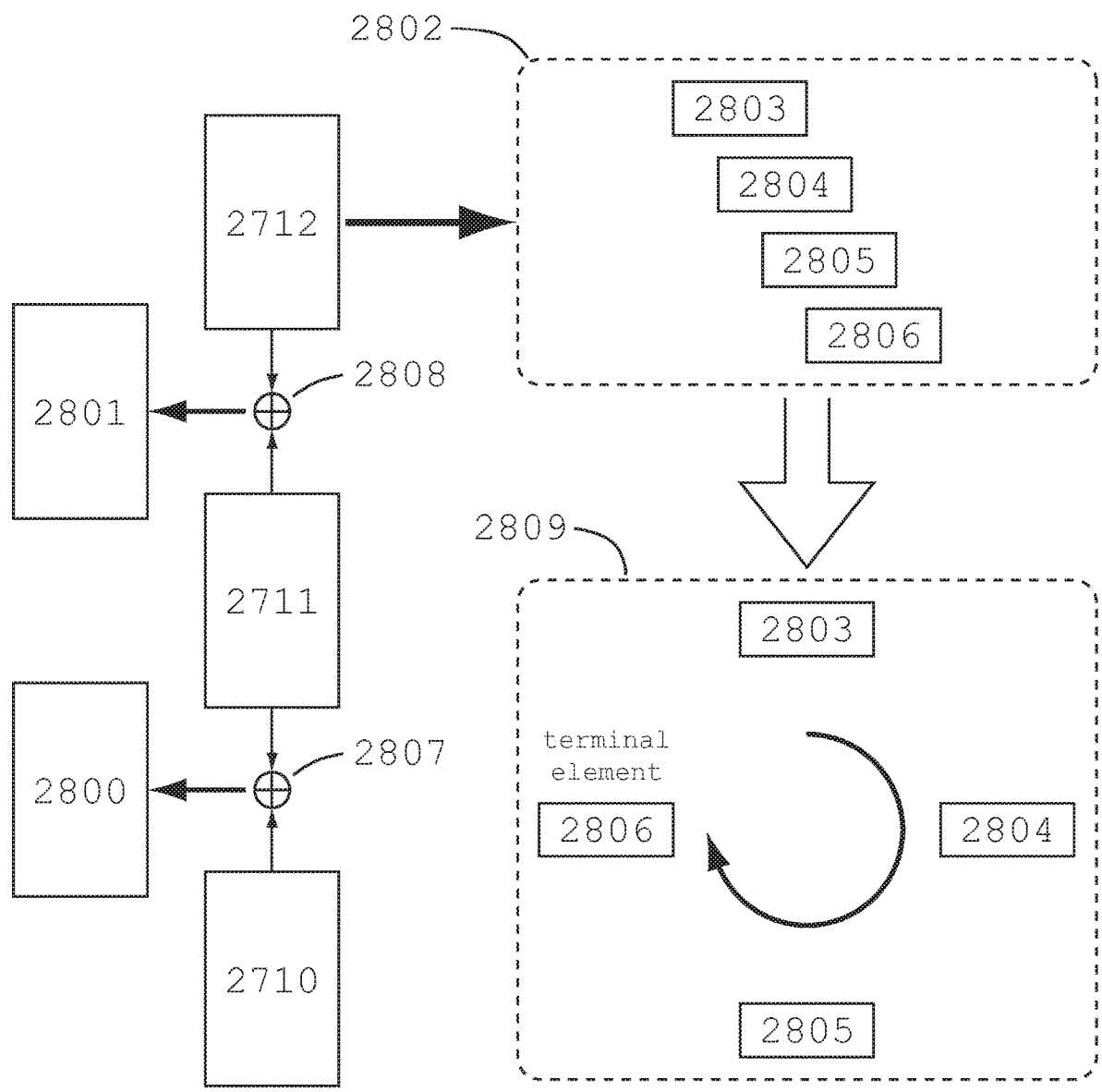
FIG. 28 illustrates process subset steps associated with the processing of very large data files, in accordance with an exemplary embodiment.

FIG. 28 illustrates an exemplary process applicable to the remaining accumulation in FIG. 27. Re-divided blocks 2710-2712 are elements of a first set of data. Block 2712 represents the remaining accumulation from FIG. 27, and becomes the terminal element of the first set of data. Blocks 2800 and 2801 are elements of a second set of data. Block 2800 results from addition modulo-2 logical operation 2807 when performed between blocks 2710 and 2711. Block 2801 results from addition modulo-2 logical operation 2808 when performed between blocks 2711 and 2712. In an embodiment, the length of block 2712 exceeds the length of an exemplary local data aspect. Accordingly, block 2712 is processed separately, similar to data having an intermediate length. A first subset of data 2802 comprised of elements 2803-2806, results from the division of block 2712. Element 2806 becomes the new terminal element when the first subset of data 2802 is arranged in cyclic order 2809, similar to the arranging of elements in cyclic order illustrated in FIG. 18.

Figure 29:
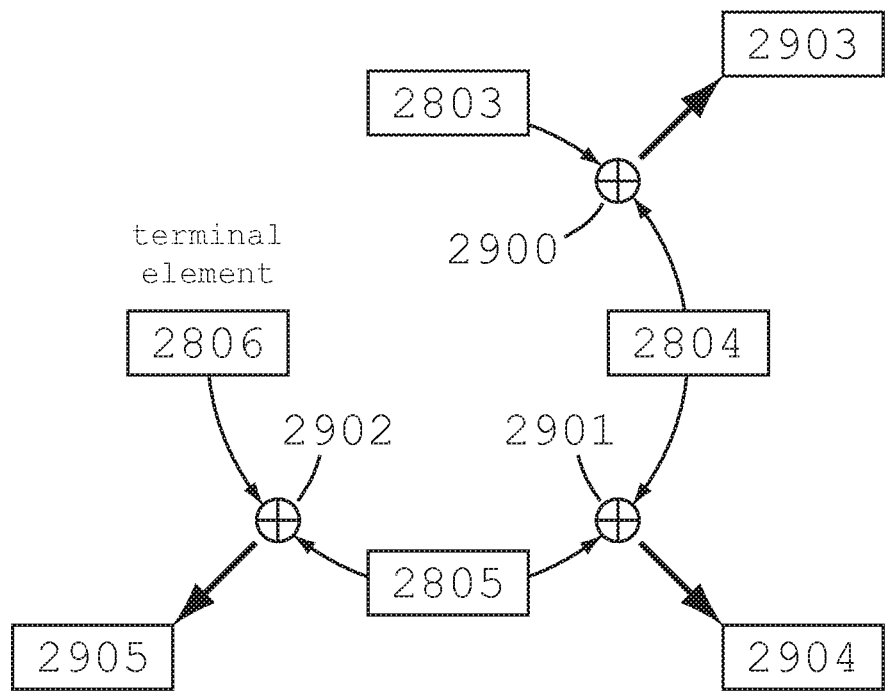
FIG. 29 illustrates terminal process subset steps associated with the processing of very large data files, in accordance with an exemplary embodiment.

FIG. 29 illustrates operations performed in the generation of a second subset of data, similar to the operations performed in the generation of a second set of data illustrated in FIG. 19. Second subset of data element 2903 results from addition modulo-2 logical operation 2900 performed between first subset of data element 2803 and first subset of data element 2804. Second subset of data element 2904 results from addition modulo-2 logical operation 2901 performed between first subset of data element 2804 and first subset of data element 2805. Second subset of data element 2905 results from addition modulo-2 logical operation 2902 performed between first subset of data element 2805 and first subset of data terminal element 2806.

Figure 30:
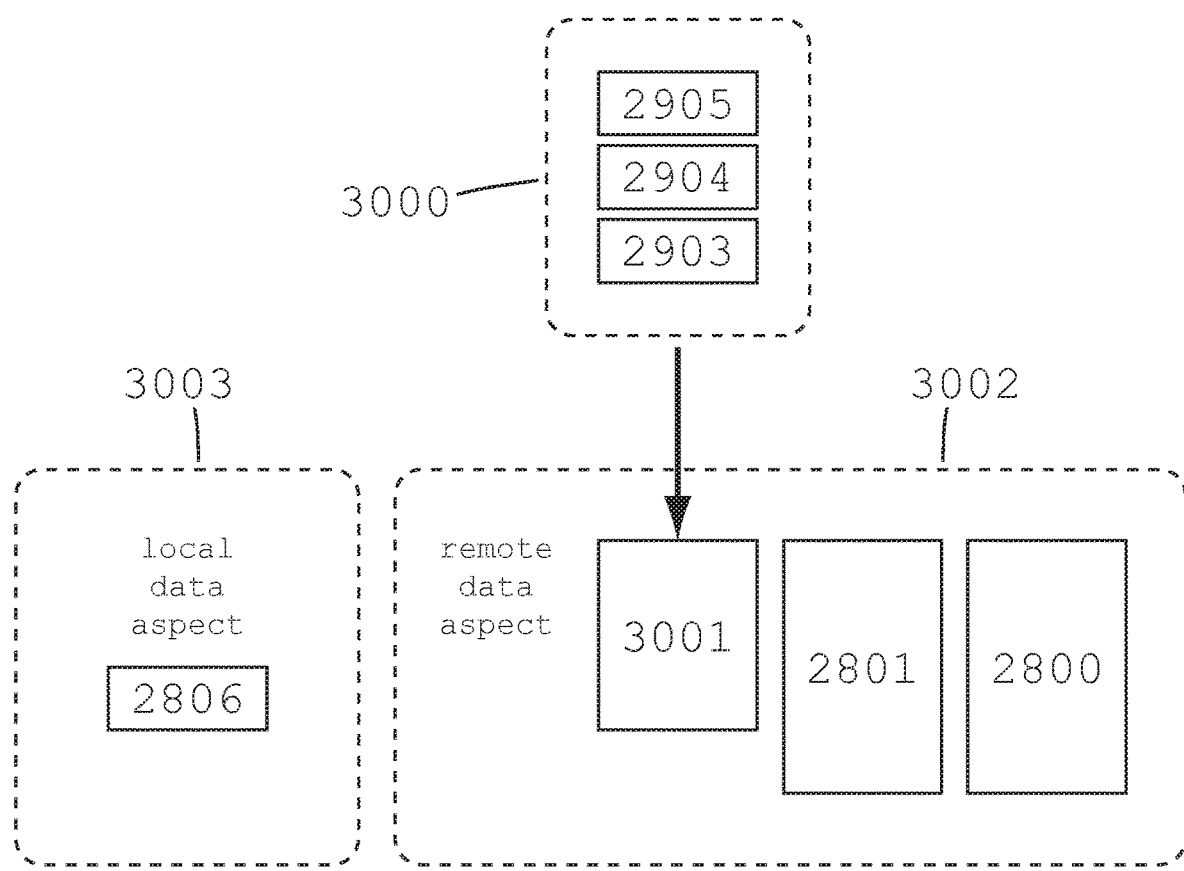
FIG. 30 illustrates conglomeration process subset steps associated with the processing of very large data files, in accordance with an exemplary embodiment.

FIG. 30 illustrates the exemplary step of aggregating elements of the second subset of data 3000 generated in FIG. 29. The length of each of the elements 2903-2905 is a fraction of the length of elements of the second set of data 2800 and 2801, produced by operations illustrated in FIG. 28. An exemplary step is to aggregate elements of the second subset of data 3000. Advantageously, the single aggregate 3001 has a length approximating that of 2800 and 2801. Therefore, remote data aspect 3002 is comprised of blocks 2800, 2801 and 3001. Local data aspect 3003 is comprised of terminal element 2806. When a data object having content substantially identical to the original very large data file 2700 is later generated, the lines of re-division 2713-2716 may be calculated if fixed subset rules were followed. Alternatively, the location of each line of re-division may be stored in the file information object (e.g., file information object 900).

Figure 31:
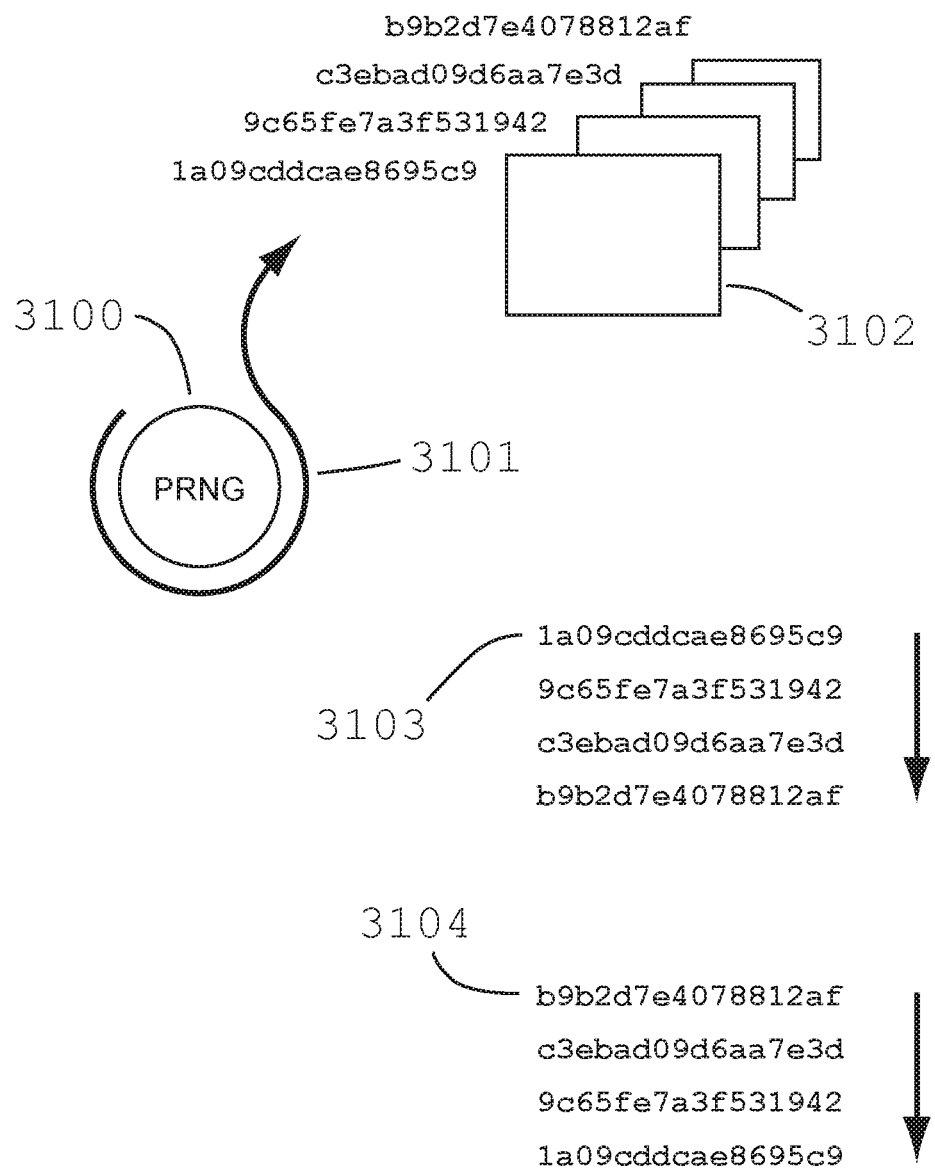
FIG. 31 illustrates the application of a PRNG to data object name generation in accordance with an exemplary embodiment.

A unique name must be attached to each block stored in remote data aspect storage. FIG. 31 illustrates the application of a PRNG 3100 to the generation of block names, in accordance with an embodiment. For each seed value, a PRNG produces a deterministic sequence of values 3101. The hexadecimal expression for each output value is converted into a literal string. Alternatively, a hash function may be applied to the output value, and the output of the hash function converted into a literal string. For example, the 64-bit output value 1,876,257,067,481,077,193 is converted into the literal representation of the hexadecimal expression for the value, used to name block 3102 "1a09cddcae8695c9". To increase the collision resistance of names, a bank of PRNG's may be used. PRNG seeds are stored in a file information object. When a data object corresponding to an emergent constituent of the emergent data file storage system is later generated, the correct seed value must be retrieved first. A PRNG may then be relied on to issue the names of blocks and their correct sequence 3103. The names are collected first and then reversed as shown by 3104.

Figure 32:
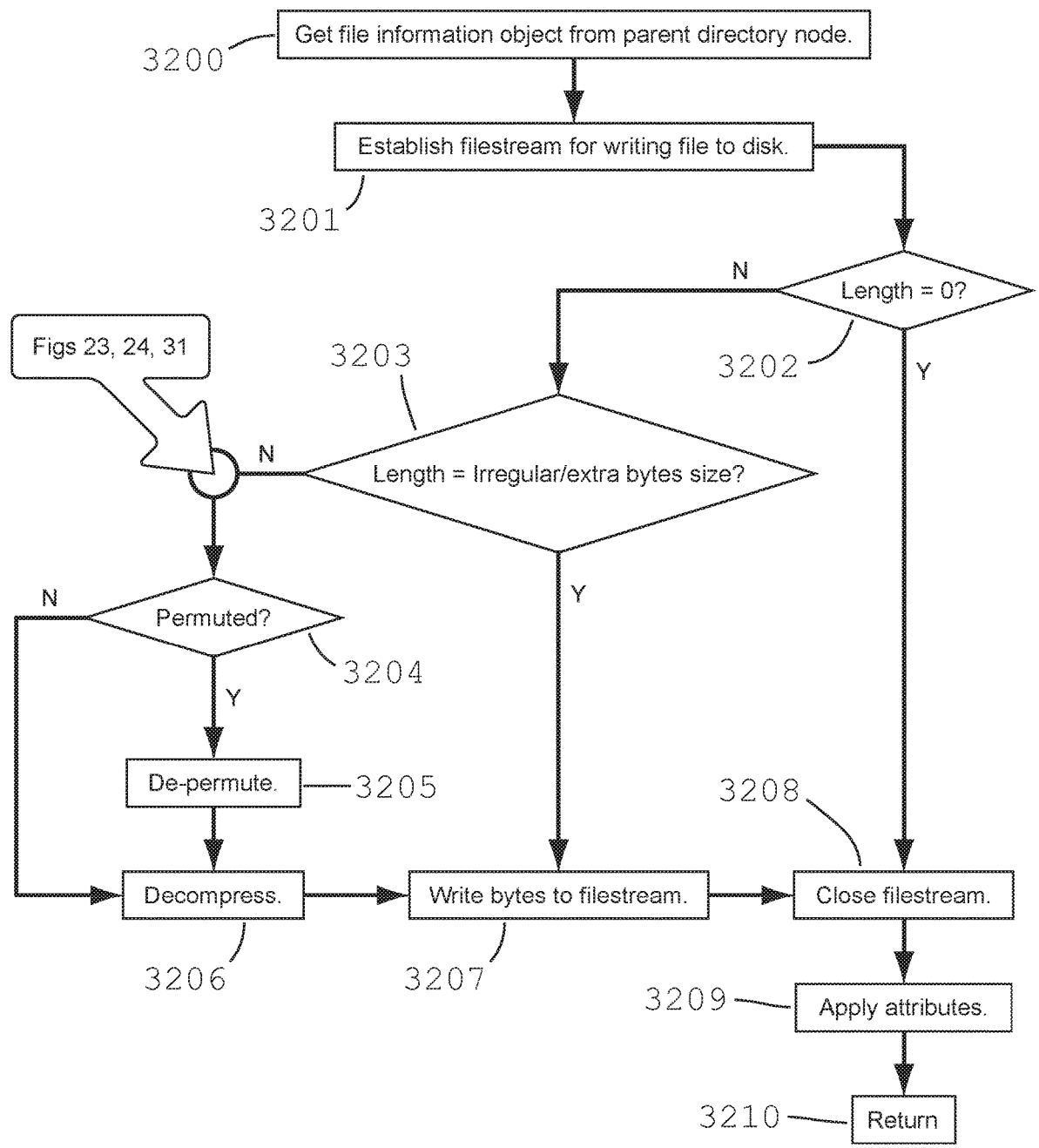
FIG. 32 is a flow chart of a method of generating a disk file in accordance with an exemplary embodiment.

FIG. 32 is a flowchart of an exemplary method of disk file generation in accordance with an embodiment. A file information object corresponding to the desired disk file is first retrieved from the parent directory node in step 3200. A filestream I/O is typically initialized for writing to media in step 3201, when given a complete disk path consisting of the name of the file and desired location. If the length of the file is zero, as determined from the file information object, the filestream is immediately closed in step 3208. Opening then closing a filestream creates an empty file at the specified location. Those skilled in the art are aware of potential exceptions a user may encounter when creating a file. For example, the user may not have the required permission or authority to create the file or another file with the same name may already exist at that location. After a filestream is closed, file attributes are obtained from the file information object and may be applied to the disk file at that time in step 3209, before returning in step 3210. Those skilled in the art will be familiar with operating system I/O functionality for updating attributes. In the event a file has a non-zero length, a separate decision in step 3203 is made in response to the bytes stored in the same file information object. If the size of the byte array is equal to the length of the file, these are written to the filestream and to the disk file in step 3207, before closing the filestream in step 3208. A non-zero length may, however, be indicated where extra bytes are absent or otherwise do not account for the length of the disk file. Other indications exist that a separate process must be invoked to resolve the data needed to continue. Once the data is retrieved, a determination is made in step 3204 to retrieve permutation information from the file information object. If necessary, the reverse of a permute operation is performed in step 3205. Decompression follows in step 3206 and the expanded bytes may then be written to the filestream in step 3207 before closing the filestream in step 3208. Again, file attributes retrieved from the file information object may then be applied.

FIG. 33 presents source code useful in implementing a depermuter. An object-oriented class given the name "Depermuter" is defined beginning on line 000. One skilled in the art will recognize that the class constructor beginning on line 006 has one argument—the permuted data object corresponding to data object 1302 in FIG. 16. Once instantiated, an object of this class returns the Boolean result of a depermute operation when the method "Depermute" defined beginning on line 011 is invoked. The de-permuted data object is returned by reference. Field "Xperm" shown on line 002, is given the value 4 which is the number of segments into which the data object was first permuted. If the number of segments was adjusted for each data object, this information must first be retrieved from the file information object. Method "Depermute" defined on line 011 has one argument—a reversed collection of values generated by a PRNG. The PRNG seed used when first permuting a data object, must be retrieved from the file information object. The collection of output values is reversed for use in steering the depermute operation. This is a similar technique to that used with names, as illustrated in FIG. 31 and explained above. The same cap separated at the beginning of a permute operation is identified on lines 020 to 026. A cap is smaller than a segment, with a length equal to the remainder when the length of the data object is divided by the Xperm value. The list "rK" defined on line 028 is used to reconstruct the original order of segments on lines 029 to 037. When reconstruction is complete, the data object is transferred to the unordered list "PK" first used to hold the permuted data object, on lines 038 to 043.

Figure 34:
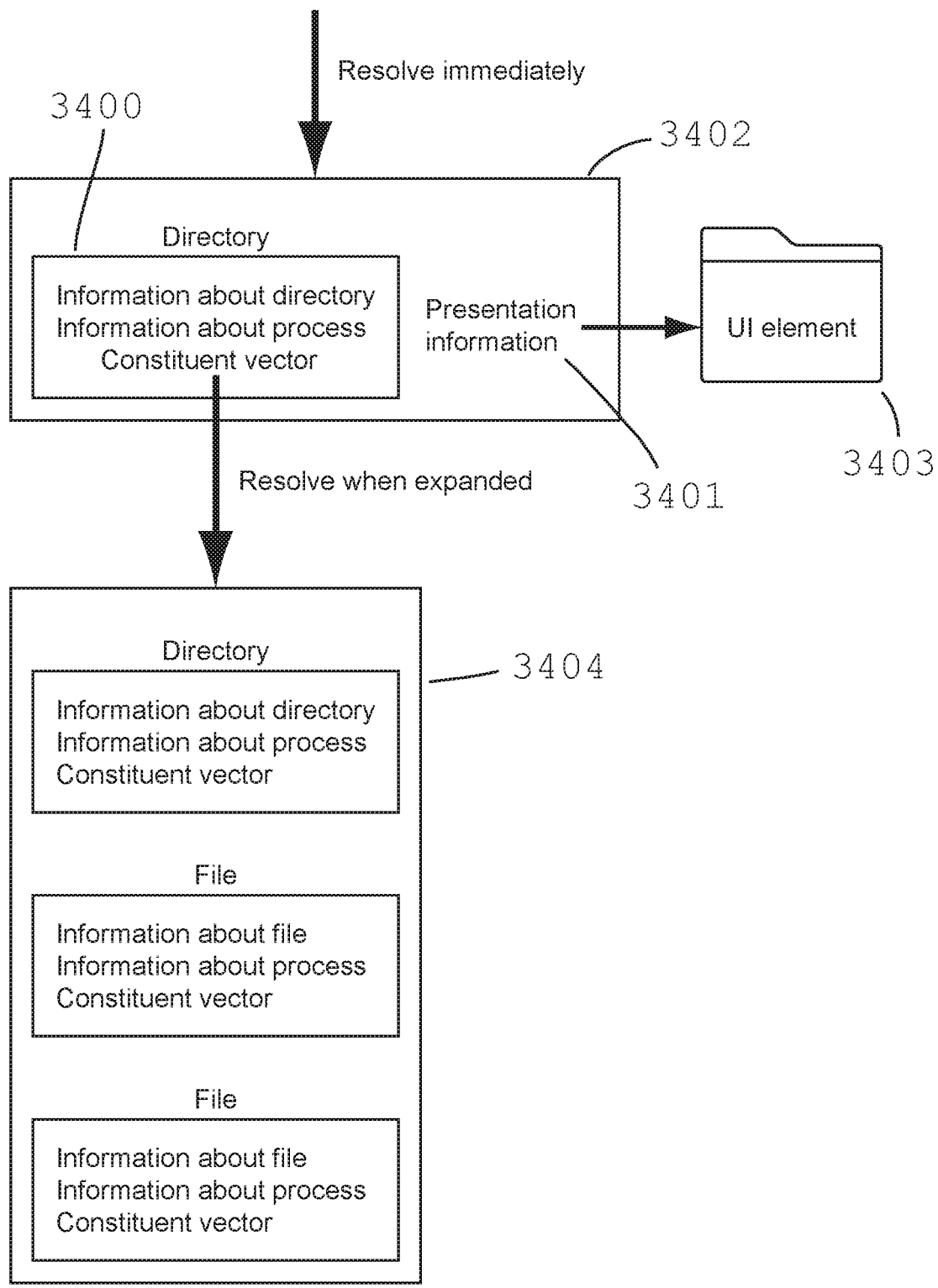
FIG. 34 depicts the relationship of containers associated with an implementation of a software application facilitating graphical exploration of the emergent data file storage system, of an exemplary embodiment.

FIG. 34 depicts the relationship between a data object corresponding to parent directory node 3400 of the emergent data file storage system, and the associated presentation information 3401. Object 3402 serves as a container for the association. In an embodiment, object 3402 is attached to user interface (i.e., UI) element 3403. A similar construct is used with files. A parent directory node contains information about constituents such as files and subdirectory nodes. A file node contains information about file content. This forms the basis of a software application that permits a user to explore the emergent data file storage system without requiring the full resolution of constituents. An exemplary software application is suggested; one having an architecture that prioritizes responsiveness and a design that provides an intuitive look and feel. Responsiveness precludes first resolving original data files in their entirety. Therefore, directory nodes contain ready information such as 3400, needed only to display emergent data file storage system constituents within the GUI of an application utilizing the emergent data file storage system. For example, ready information may contain a simple indication of whether or not a directory contains subdirectories. Only when the user activates a particular UI element such as 3403, is the attached directory node fully resolved to 3404 so that the names of all the subdirectories and files may be displayed. An intuitive look and feel will be appreciated by users when visual elements resemble those of familiar applications.

Discussions of software application design and architecture herein should not be interpreted in a limiting way. It is expected that those skilled in the art will readily conjure alternative implementations to those presented here. Importantly, any software application that permits a user to explore the emergent data file storage system must do so with limited reliance on the operating system. Emergent constituents of the emergent data file storage system do not have physical paths and can be represented visually only as potentialities.

Figure 35:
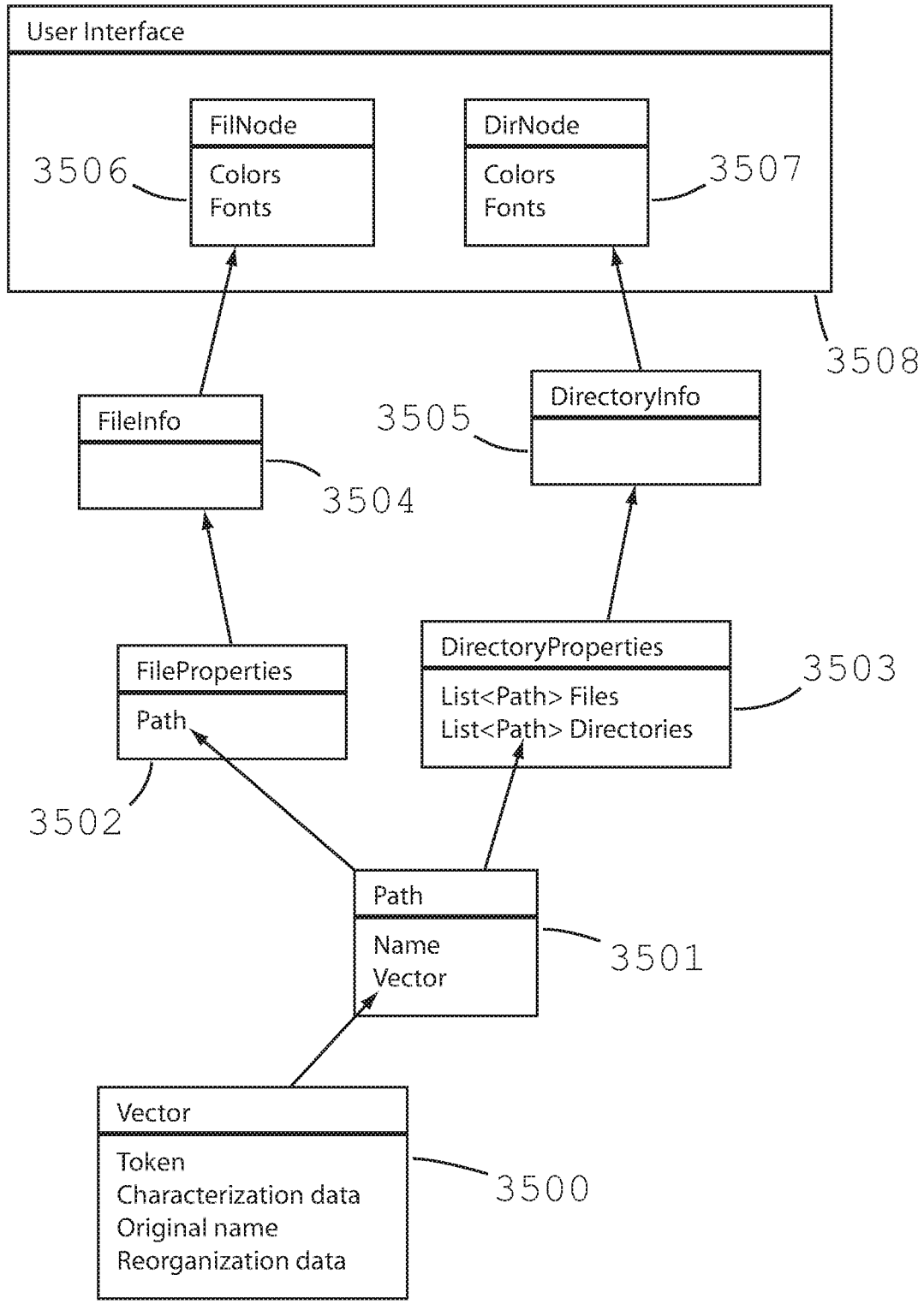
FIG. 35 depicts the relationships between software elements related to containers associated with the graphical user interface (i.e., GUI), of an exemplary embodiment.

FIG. 35 depicts the relationship between exemplary types of software elements of an exemplary application utilizing the emergent data file storage system, in accordance with an aspect of the invention. A Vector object 3500 is a container for information needed to generate an original file or directory node, such as information needed to retrieve a local data aspect, for example. During runtime, a Vector object 3500 is used to construct a Path object 3501. Path objects are common to both a FileProperties object 3502 and a DirectoryProperties object 3503. Importantly, Vector objects are resolved only from parent operations and cannot be found in a certain physical location. Preliminarily retrieving a local data aspect from the local portable data storage device is associated with resolving a data object corresponding to an emergent file or directory node constituent of the emergent data file storage system. Ready information essential to a responsive software application utilizing the emergent data file storage system is contained in a FileInfo object 3504 and a DirectoryInfo object 3505. User interface 3508 may feature presentation constructs such as a tree or a grid. Correspondence between elements of an information object and a presentation construct is ordered by FilNode object 3506 and DirNode object 3507.

Figure 36:
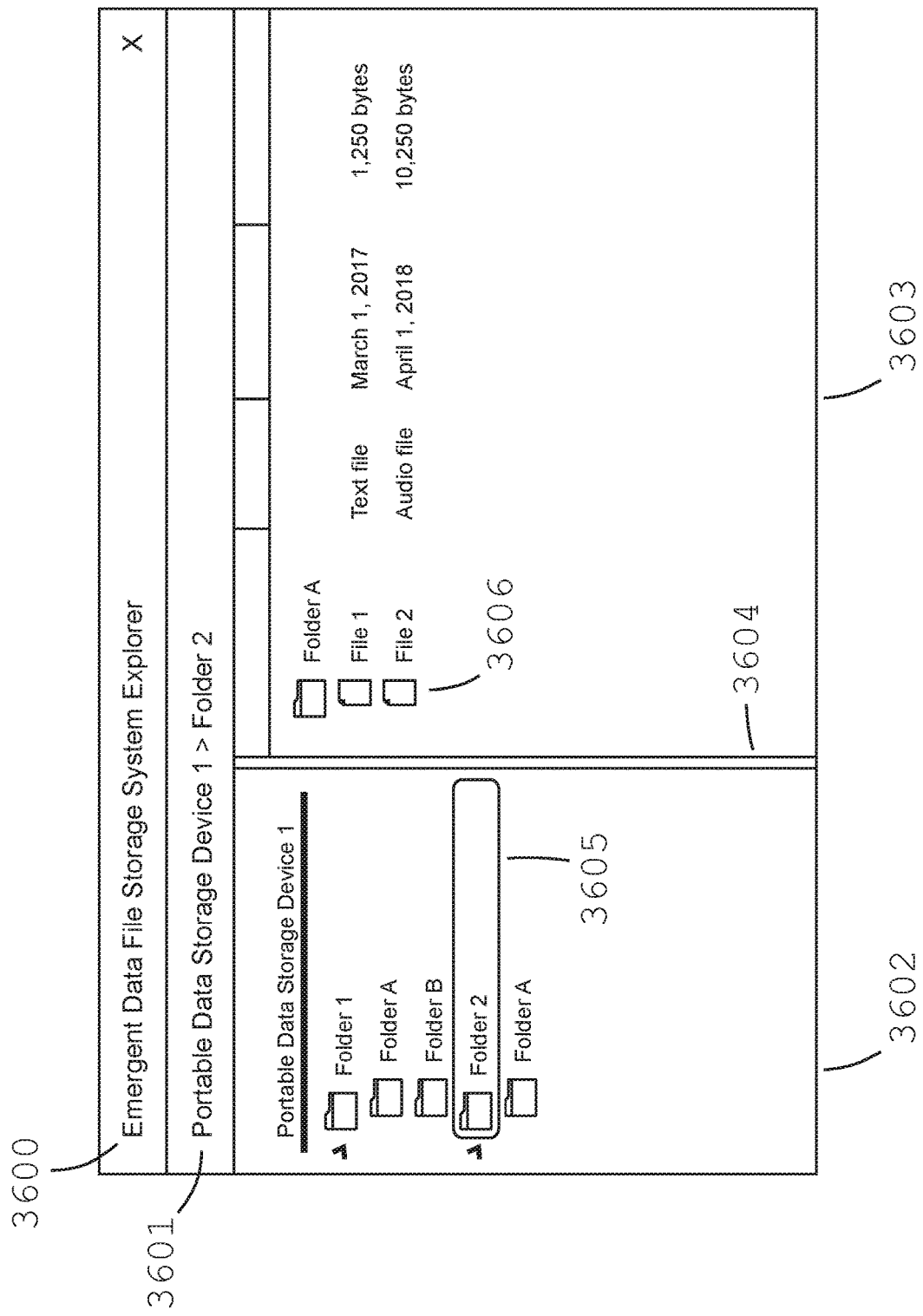
FIG. 36 illustrates an example GUI of a software application for graphically exploring the emergent data file storage system, in accordance with an exemplary embodiment.

FIG. 36 is an illustration of an exemplary and non-limiting GUI associated with aspects of the invention. The GUI title bar 3600 and mock path 3601 contribute to an intuitive user experience. The left panel 3602 presents a hierarchical view of the emergent data file storage system.

This example should not be construed in a limiting way. Those skilled in the art will readily imagine numerous alternatives to the hierarchical organization of constituents of the emergent data file storage system. The right panel 3603 presents a flat view of constituents 3606 contained immediately inside the selected directory node 3605. One skilled in the art will recognize a hierarchical view as one commonly implemented with a treeview-type control, and a flat view as one commonly implemented with a gridview-type control. Divider 3604 separates the organized presentation in the left panel from the organized presentation in the right panel; commonly implemented with a slider-type control. In an embodiment, the GUI comprises a visual representation of a file or directory node constituent of the emergent data file storage system and the organizational relationship of the constituent with other constituents of the same emergent data file storage system.

Those skilled in the art will recognize the striking contrast to conventional data file storage technology presented by aspects of the present invention. Conventional data storage technology binds data to physical locations. It is well known to those skilled in the art that the content of data files stored in physical locations may be obtained by direct examination of storage media, regardless of how the data files are organized. In contrast, original file information cannot be obtained by analyzing local data aspects and remote data aspects corresponding to emergent data files and directory nodes of the emergent data file storage system described herein. Directory nodes associated with conventional data storage technology contain the physical locations of data files and subdirectory nodes. In contrast, local data aspects and remote data aspects are always stored without reference to other data. Consequently, a remote data aspect may be transferred to remote data aspect storage openly and without additional protection. Moreover, process parameters associated with the emergent data file storage system is itself bound to a constituent of the emergent data file storage system described herein; obtainable only by the recursive descent of parent processes and not from a certain physical location.

Conventional data storage technologies often employ means to divide data files into parts for efficient storage. However, the parts must still be linked by attaching to each part some information about other parts, or by storing their association in a map. Regarding cloud storage, any means of dividing data files into parts limits the benefit to providers. Users are compelled to transfer data files in their entirety, with no provision for altering transference. For the most part, federating cloud storage providers entails little more than storing different data files in different locations (i.e., different providers), thereby destroying any organization assigned to the data files by a user. In contrast, the emergent data file storage system described herein enables federating cloud storage providers with high granularity and of great benefit to users. For at least these reasons, those skilled in the art will appreciate how embodiments of the present invention overcome numerous disadvantages inherent in the use of conventional data storage technologies.

Embodiments of the present disclosure comprise a host computer having one or more processors configured to execute the method of binding a local data storage device to remote data storage space with an emergent data file storage system. The emergent data file storage system is manifest only within the union of local and remote data storage spaces concurrently accessible to a software application executing on the host computer. The method of binding a local data storage device to remote data storage space with an emergent data file storage system is comprised of an operation to divide, by the application executing on a host computer, a data object into a first set of data elements, wherein the first set of data elements includes a terminal element. Said method is further comprised of an operation to generate, by the same application executing on the host computer, a second set of data elements by performing in cyclic order addition modulo-2 logical operations between adjacent elements of the first set of data elements, whereby one member of the second set of data elements results from each addition modulo-2 logical operation. Said first set of data represents at least one of information content, format, and attributes of a disk file, or the informational content of an element of another set of data, or process and organizational information of file and subdirectory constituents contained in a parent directory node that is itself a constituent of the same emergent data file storage system. In an embodiment, the terminal element of the first set of data elements is replaced with the result of an addition modulo-2 logical operation performed between the terminal element of the first set of data elements and a member of the second set of data elements. The same application executing on a host computer separately transfers the terminal element of the first set of data elements to the local portable data storage device and the generated second set of data elements to the remote data storage space.

Embodiments of the present disclosure further comprise a host computer having one or more processors configured to execute compress and/or permute operations of the data object before said dividing, and to include process parameters of said compress and/or permute operations in process information of file and subdirectory constituents contained in a parent directory node that is itself a constituent of the same emergent data file storage system. Embodiments of the present disclosure further comprise determining the number of elements of the first set of data in response to a data transfer time constraint and/or a data storage space constraint, then altering transference of the second set of data to the remote data storage facilities in accordance with the constraints.

Embodiments of the present disclosure comprise a host computer having one of more processors configured to execute the method of generating a data object by first retrieving a local data aspect from a local data storage device and a remote data aspect from remote data aspect storage space, together corresponding to the data object. Said method of generating a data object is further comprised of the step of deriving from the retrieved data aspects, both a second set of data and the terminal element of a first set of data. In an embodiment, said terminal element of the first set of data is preliminarily replaced by the result of an addition modulo-2 logical operation performed between the retrieved terminal element of the first set of data, and an element of the retrieved second set of data. Said method of generating a data object is further comprised of the step of performing an addition modulo-2 logical operation between said terminal element of the first set of data, and a member of the derived second set of data, whereby an element of a resolved set of data results. Said method of generating a data object is further comprised of steps to successively perform addition modulo-2 logical operations between each resulting element of said resolved set of data, and the next member of the derived second set of data, whereby a next element of said resolved set of data results. Said method of generating a data object is further comprised of the step of assembling said terminal element of the first set of data together with all resulting members of said resolved set of data, whereby said assembling results in a single coherent block of data representing at least one of informational content, format and attributes of a disk file or directory node, or informational content of an element of another first set of data.

Embodiments of the present disclosure further comprise a host computer having one or more processors configured to execute the method of reversing permute and/or compress operations of the generated data object in accordance with information resolved from a parent directory node of the same emergent data file storage system.

Embodiments within the scope of the present disclosure comprise a host computer having one of more processors configured to execute a software application whereby a graphical user interface (i.e., GUI) presents to a user the visual representation of an emergent file or directory node constituent of the emergent data file storage system, and the organizational relationship of said emergent file or directory node constituent with other emergent file or directory node constituents of the same said emergent data file storage system. Embodiments of the present disclosure further comprise generating, by said software application executing on the host computer, a GUI, whereby a user is presented with the content of a generated data object along with an option to write the data object to a data file storage system accessible to the user.

An exemplary system for implementing aspects of the disclosure is comprised of a local data storage device, one or more remote data storage devices and a host computing device having one or more processors configured to communicate with the local data storage device, communicate with the one or more remote data storage devices, perform input and output operations consistent with reading and writing data files, compress and decompress blocks of data, permute and de-permute blocks of data, divide blocks of data into elements, consolidate elements into a single coherent block of data, perform addition modulo-2 operations between elements of data, transfer a local data aspect to the local portable data storage device, transfer a remote data aspect to the one or more remote data storage devices, retrieve a local data aspect from the local portable data storage device and retrieve a remote data aspect from the one or more remote data storage devices.

Embodiments within the scope of the present disclosure also include computer-readable media for carrying or having computer-executable instructions or data structures stored thereon. Such computer-readable media can be any available media that is accessible by a special purpose computer. By way of example, and not limitation, computer-readable storage media include volatile and nonvolatile, removable and non-removable media implemented in any method or technology for storage of information such as computer readable instructions, data structures, program modules or other data. Computer storage media are non-transitory and include, but are not limited to, random access memory (i.e., RAM), read only memory (i.e., ROM), electrically erasable programmable ROM (i.e., EEPROM), compact disk ROM (i.e., CD-ROM), digital versatile disks (DVD), or other optical disk storage, solid state drives (i.e., SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general-purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

An exemplary system for implementing aspects of the disclosure also include a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes nonvolatile and volatile memory types. A basic input/output system (i.e., BIOS), containing the basic routines that help transfer information between elements within the computer, such as during start-up, may be stored in ROM. Further, the computer may include any device (e.g., computer, laptop, tablet, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

One or more aspects of the disclosure may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (i.e., FPGAs), and the like.

The computer may operate in a networked environment using logical connections to one or more remote computers. The remote computers may each be another personal computer, a tablet, a personal digital assistant (i.e., PDA), a server, a router, a network-connected personal computer (i.e., PC), a peer device, or other common network node, and typically include many or all of the elements described above relative to the computer. The logical connections include a local area network (i.e., LAN) and a wide area network (i.e., WAN), presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over a wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation contemporaneously with, before, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

In view of the above, it will be seen that the several objects of the invention are achieved and other advantageous results attained.

As various changes could be made in the above systems and methods without departing from the scope of the invention, it is intended that all matter contained in the above description and shown in the accompanying drawings shall be interpreted as illustrative and not in a limiting sense.

What is claimed is:

1. A computer-implemented method of binding a local data storage device to remote data storage space with an emergent data file storage system manifest only within the union of local and remote data storage spaces concurrently accessible to an application executing on a host computer, said method comprising:

dividing, by the application executing on the host computer, a data object into a first set of data elements, wherein the first set of data elements includes a first total number of elements including a terminal element;

generating, by the application executing on the host computer, a second set of data elements by identifying a cyclic order for the first set of data elements, performing an addition modulo-2 logical operation between adjacent elements of the first set of data elements as identified from the cyclic order, whereby each one of the second set of data elements results from a respective addition modulo-2 logical operation performed on a respective set of the adjacent elements of the first set of data elements as arranged in the cyclic order such that after all addition modulo-2 operations are performed a second total number of elements in the second set of data elements is less than the first total number of elements;

transferring, by the application executing on the host computer, a local data aspect to the local portable data storage device; and transferring, by the application executing on the host computer, the second set of data elements to the remote data storage space.

2. The method of claim 1, wherein the first set of data elements represents at least one of informational content, format, and attributes of a disk file or informational content of an element of another first set of data.

3. The method of claim 1, wherein the first set of data elements represents process and organizational information of file and subdirectory constituents contained in a parent directory node, said parent directory node being a constituent of same said emergent data file storage system.

4. The method of claim 1, further comprising:
performing an addition modulo-2 logical operation between the terminal element of the first set of data elements and a member of the second set of data to generate the local data aspect.

5. The method of claim 1, further comprising at least one of:
compressing, by the application executing on the host computer, the data object before said dividing; and
permuting, by the application executing on the host computer, the data object before said dividing.

6. The method of claim 1, further comprising generating, by the application executing on the host computer, a graphical user interface (i.e., GUI) that presents a visual representation of an emergent file or directory node constituent of the emergent data file storage system and the organizational relationship of said constituent with other constituents of the same said emergent data file storage system.

7. The method of claim 1, further comprising:
determining, by the application executing on the host computer, the first total number of elements into which the data object is divided to create the first set of data elements responsive to one or more resource constraints, wherein the one or more resource constraints comprise at least one of data transfer time and data storage space; and
modifying, by the application executing on the host computer, transference of the second set of data elements to the remote data storage facilities in response to the one or more resource constraints.

8. The method of claim 1 further comprising:
transferring, by the application executing on the host computer, the terminal file to the local portable data storage device for use as the local data aspect.

9. The method of claim 1 further comprising:
extracting, by the application executing on the host computer, any irregular bytes from the data object;
dividing, by the application executing on the host computer, the data object excluding the irregular bytes into the first set of data elements such that each of the first set of data elements is a same size; and
storing the irregular bytes in a file information object associated with the data object.

10. The method of claim 1 further comprising:
determining, by the application executing on the host computer, whether the data object includes irregular bytes;
when the data object fails to include the irregular bytes dividing, by the application executing on the host computer, the data object into the first set of data elements such that each of the first set of data elements is a same size; and when the data object includes the irregular bytes dividing, by the application executing on the host computer, the data object into the first set of data elements such that a respective length of each of the first set of data elements remains the same or increases in the direction of the cyclic order and generating the second set of data elements such that each of the second set of data elements has a respective length equal to a smallest respective length of the respective set of the adjacent elements from which each of the second set of data elements is generated, storing the irregular bytes in a file information object associated with the data object.

11. A computer-implemented method of generating a data object, said generating comprising:
retrieving from a local data storage device a local data aspect corresponding to the data object;
retrieving from remote data storage space a remote data aspect corresponding to the data object;
deriving a terminal element of a first set of data elements from the local data aspect;
retrieving a second set of data elements from the remote data aspect;
identifying a cyclic order for the second set of data elements;
identifying a first member of the second set of data elements from the cyclic order;
performing an addition modulo-2 logical operation between the terminal element and the first member of the second set of data elements to derive a first respective element of the first set of data elements;
beginning with the first respective element of the first set of data elements, successively performing the addition modulo-2 logical operation between a next member of the second set of data elements from the cyclic order and a respective element of the first set of data elements derived from an immediately preceding addition modulo-2 logical operation until each member of the second set of data elements has been subjected to the addition modulo-2 logical operation and each of the first set of data elements has been derived, wherein, after all addition modulo-2 operations are performed, a first total number of the first set of data elements is greater than a second total number of the second set of data elements; and
assembling each element of the first set of data elements together into the data object such that the data object includes a single coherent block of data having content substantially identical to said first set of data elements.

12. The method of claim 11, wherein the terminal element is derived from the local data aspect by performing the additional modulo-2 logical operation between the local data aspect and a member of the second set of data elements.

13. The method of claim 11, wherein permuting and/or compression of the data object is reversed in accordance with information stored in a parent directory node of an emergent data file storage system.

14. The method of claim 11, wherein the data object represents at least one of informational content, format and attributes of a disk file or informational content of an element of another first set of data.

15. The method of claim 11, further comprising:
recording the data object by nonvolatile data storage means; and updating attributes of the data object as recorded in the nonvolatile data storage means in accordance with information stored in a parent directory node of an emergent data file storage system.

16. The method of claim 11, further comprising displaying content of the data object in a GUI without recording the content in a nonvolatile data storage device.

17. The method of claim 11, wherein the data object represents process and organizational information of file and subdirectory constituents contained in a parent directory node, said parent directory node being a constituent of an emergent data file storage system.

18. The method of claim 11 wherein the local data aspect is the terminal element and deriving the terminal element from the local data aspect includes retrieving the terminal element from the local data storage device.

19. A system for implementing an emergent data file storage system, said system comprising:
a local portable data storage device;
one or more remote data storage devices; and
a host computing device, said host computing device having one or more processors configured to:
communicate with the local portable data storage device,
communicate with the one or more remote data storage devices,
execute input and output operations consistent with reading and writing data files,
compress and decompress one or more blocks of data representing at least one data file,
permute and de-permute one of more blocks of data representing the at least one data file,
transform one or more blocks of data representing the at least one data file into a data aspect pair, by:
dividing the one or more blocks of data representing the at least one data file into a first set of data elements, wherein the first set of data elements includes a first total number of elements including a terminal element,
generating a second set of data elements by identifying a first cyclic order for the first set of data elements, performing an addition modulo-2 logical operation between adjacent elements of the first set of data elements as identified from the first cyclic order, whereby each one of the second set of data elements results from a respective addition modulo-2 logical operation performed on a respective set of the adjacent elements of the first set of data elements as arranged in the cyclic order such that after all addition modulo-2 operations are performed on the first set of data elements a second total number of elements in the second set of data elements is less than the first total number of elements,
transferring a local data aspect to the local portable data storage device,
transferring the second set of data elements as a remote data aspect to the one or more remote data storage devices, and transform a data aspect pair into a single coherent block of data, by:
retrieving the local data aspect from the local portable data storage device,
retrieving the remote data aspect from the one or more remote data storage devices,
deriving the terminal element of the first set of data elements from the local data aspect,
retrieving the second set of data elements from the remote data aspect,
identifying a second cyclic order for the second set of data elements,
generating the first set of data elements by (1) identifying a first member of the second set of data elements from the second cyclic order, (2) performing the addition modulo-2 logical operation between the terminal element as derived from the local data aspect and the first member of the second set of data elements to derive a first respective element of the first set of data elements, and (3) beginning with the first respective element of the first set of data elements, successively performing the addition modulo-2 logical operation between a next member of the second set of data elements from the second cyclic order and a respective element of the first set of data elements derived from an immediately preceding addition modulo-2 logical operation until each member of the second set of data elements has been subjected to the addition modulo-2 logical operation and each of the first set of data elements has been derived, and
assembling each element of the first set of data elements together into the data object such that the data object includes a single coherent block of data having content substantially identical to said first set of data elements.

20. The system of claim 19, wherein the one or more processors of the host computing device are further configured to maintain synchronized copies of blocks of data comprising the remote data aspect, on both a local data storage device and the one or more remote data storage devices by executing a synchronizing software agent.

* * * * *